United States Patent
Matas

(10) Patent No.: US 9,557,876 B2
(45) Date of Patent: Jan. 31, 2017

(54) HIERARCHICAL USER INTERFACE

(71) Applicant: Michael Matas, San Francisco, CA (US)

(72) Inventor: Michael Matas, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 248 days.

(21) Appl. No.: 13/677,132

(22) Filed: Nov. 14, 2012

(65) Prior Publication Data

US 2013/0198661 A1   Aug. 1, 2013

Related U.S. Application Data

(63) Continuation-in-part of application No. 13/487,805, filed on Jun. 4, 2012.

(60) Provisional application No. 61/593,841, filed on Feb. 1, 2012.

(51) Int. Cl.
*G06F 3/048* (2013.01)
*G06F 9/44* (2006.01)
*G06F 3/0481* (2013.01)

(52) U.S. Cl.
CPC .............. *G06F 3/048* (2013.01); *G06F 3/0481* (2013.01); *G06F 9/4443* (2013.01)

(58) Field of Classification Search
None
See application file for complete search history.

(56) References Cited

U.S. PATENT DOCUMENTS

| | | | |
|---|---|---|---|
| 4,730,314 A | 3/1988 | Noguchi | |
| 5,727,129 A | 3/1998 | Barrett | |
| 6,421,071 B1 | 7/2002 | Harrison | |
| 6,847,388 B2 | 1/2005 | Anderson | |
| 6,934,740 B1 | 8/2005 | Lawande | |
| 6,948,125 B2 | 9/2005 | Detweiler | |
| 6,971,957 B2 | 12/2005 | Osako | |
| 7,320,113 B2 | 1/2008 | Roberts | |
| 7,434,245 B1 | 10/2008 | Shiga | |
| 7,439,975 B2 | 10/2008 | Hsu | |
| 7,663,620 B2 | 2/2010 | Robertson | |
| 7,663,623 B2 | 2/2010 | Zhou | |
| 7,664,739 B2 | 2/2010 | Farago | |
| 7,667,719 B2 | 2/2010 | Goodwin | |
| 7,675,518 B1 | 3/2010 | Miller | |
| 7,689,933 B1 | 3/2010 | Parsons | |
| 7,743,322 B2 | 6/2010 | Atkins | |
| 7,769,794 B2 | 8/2010 | Moore | |
| 7,797,641 B2 * | 9/2010 | Karukka | G06F 3/0482 715/739 |

(Continued)

OTHER PUBLICATIONS

U.S. Appl. No. 14/569,475, filed Dec. 12, 2014, Matas.

(Continued)

*Primary Examiner* — Maryam Ipakchi
(74) *Attorney, Agent, or Firm* — Baker Botts, LLP

(57) ABSTRACT

In one embodiment, a method includes presenting a hierarchical user interface on a screen of an electronic device, the hierarchical user interface having one or more content sections at a first level and each content section having one or more content items at one or more second levels above the first level; adjusting a layout of the content sections or the content items of each content section based on a size, orientation, or aspect ratio of the screen of the electronic device; and enabling a user to view the content sections and the content items of each content section.

16 Claims, 21 Drawing Sheets

(56) References Cited

U.S. PATENT DOCUMENTS

| | | | |
|---|---|---|---|
| 7,817,823 B1 | 10/2010 | O'Donnell | |
| 7,890,889 B2 | 2/2011 | Artman | |
| 7,916,157 B1 | 3/2011 | Kelley | |
| 7,996,788 B2 | 8/2011 | Carmichael | |
| 8,006,195 B1 | 8/2011 | Woodings | |
| 8,082,522 B2 | 12/2011 | Kinouchi | |
| 8,131,898 B2 | 3/2012 | Shah | |
| 8,140,404 B1 | 3/2012 | Scott | |
| 8,341,543 B2 | 12/2012 | Shah | |
| 8,365,091 B2 | 1/2013 | Young | |
| 8,416,198 B2 | 4/2013 | Rathnam | |
| 8,423,889 B1 | 4/2013 | Zagorie | |
| 8,438,504 B2 | 5/2013 | Cranfill | |
| 8,458,614 B1 | 6/2013 | Smith | |
| 8,473,868 B1 | 6/2013 | Kauffman | |
| 8,516,385 B1 | 8/2013 | Eismann | |
| 8,533,190 B2 | 9/2013 | Walker | |
| 8,539,344 B2 | 9/2013 | Hull | |
| 8,539,384 B2 | 9/2013 | Hinckley | |
| 8,549,442 B2 | 10/2013 | Marks | |
| 8,584,027 B2 | 11/2013 | Quennesson | |
| 8,635,531 B2 | 1/2014 | Graham | |
| 8,639,694 B1 | 1/2014 | Wolfe | |
| 8,656,312 B2 | 2/2014 | Kagaya | |
| 8,669,950 B2 | 3/2014 | Forstall | |
| 8,683,378 B2 | 3/2014 | Bull | |
| 8,736,561 B2* | 5/2014 | Anzures | G06F 3/04883 345/173 |
| 8,799,658 B1 | 8/2014 | Seller | |
| 8,806,371 B2 | 8/2014 | Louch | |
| 8,856,678 B1 | 10/2014 | Cho | |
| 8,856,684 B2 | 10/2014 | Duhig | |
| 8,904,304 B2 | 12/2014 | Farago | |
| 8,930,992 B2 | 1/2015 | Sugiyama | |
| 8,976,199 B2 | 3/2015 | Matas | |
| 8,977,980 B2 | 3/2015 | Abe | |
| 8,984,428 B2 | 3/2015 | Matas | |
| 8,990,691 B2 | 3/2015 | Matas | |
| 8,990,719 B2 | 3/2015 | Matas | |
| 8,997,151 B2 | 3/2015 | Chai | |
| 9,003,305 B2 | 4/2015 | Matas | |
| 9,007,371 B2 | 4/2015 | Matas | |
| 9,009,626 B2 | 4/2015 | Tsuk | |
| 9,098,168 B2 | 8/2015 | Matas | |
| 2001/0030667 A1 | 10/2001 | Kelts | |
| 2001/0033303 A1 | 10/2001 | Anderson | |
| 2002/0029232 A1 | 3/2002 | Bobrow | |
| 2002/0070982 A1 | 6/2002 | Hill | |
| 2002/0107892 A1 | 8/2002 | Chittu | |
| 2003/0001907 A1 | 1/2003 | Bergsten | |
| 2003/0046401 A1 | 3/2003 | Abbott | |
| 2003/0051214 A1 | 3/2003 | Graham | |
| 2003/0090504 A1 | 5/2003 | Brook | |
| 2003/0236917 A1 | 12/2003 | Gibbs | |
| 2004/0001106 A1* | 1/2004 | Deutscher et al. | 345/838 |
| 2004/0095376 A1 | 5/2004 | Graham | |
| 2004/0145603 A1 | 7/2004 | Soares | |
| 2005/0005246 A1 | 1/2005 | Card | |
| 2005/0010955 A1 | 1/2005 | Elia | |
| 2005/0055426 A1 | 3/2005 | Smith | |
| 2005/0071783 A1 | 3/2005 | Atkins | |
| 2005/0177798 A1* | 8/2005 | Thomson | G06F 1/1613 715/788 |
| 2005/0210403 A1 | 9/2005 | Satanek | |
| 2005/0262149 A1 | 11/2005 | Jung | |
| 2006/0017735 A1 | 1/2006 | Rabb | |
| 2006/0036625 A1 | 2/2006 | Judd | |
| 2006/0056334 A1 | 3/2006 | Yuan | |
| 2006/0059425 A1 | 3/2006 | Anspach | |
| 2006/0150091 A1 | 7/2006 | Suzuki | |
| 2006/0174209 A1 | 8/2006 | Barros | |
| 2006/0230354 A1 | 10/2006 | Jennings | |
| 2006/0236251 A1 | 10/2006 | Kataoka | |
| 2006/0253777 A1 | 11/2006 | Yalovsky | |
| 2007/0073719 A1 | 3/2007 | Ramer | |
| 2007/0088681 A1 | 4/2007 | Aravamudan | |
| 2007/0115300 A1 | 5/2007 | Barney | |
| 2007/0150826 A1 | 6/2007 | Anzures | |
| 2007/0198950 A1* | 8/2007 | Dodge | G06F 3/0481 715/815 |
| 2007/0226640 A1 | 9/2007 | Holbrook | |
| 2007/0258642 A1 | 11/2007 | Thota | |
| 2007/0271516 A1 | 11/2007 | Carmichael | |
| 2007/0281733 A1* | 12/2007 | Griffin | G06F 1/1626 455/550.1 |
| 2008/0022229 A1 | 1/2008 | Bhumkar | |
| 2008/0025529 A1 | 1/2008 | Keohane | |
| 2008/0052636 A1 | 2/2008 | Abe | |
| 2008/0052742 A1* | 2/2008 | Kopf et al. | 725/34 |
| 2008/0065675 A1 | 3/2008 | Bozich | |
| 2008/0079972 A1 | 4/2008 | Goodwin | |
| 2008/0082927 A1 | 4/2008 | Kelts | |
| 2008/0098330 A1 | 4/2008 | Tsuk | |
| 2008/0155458 A1 | 6/2008 | Fagans | |
| 2008/0168404 A1 | 7/2008 | Ording | |
| 2008/0174570 A1 | 7/2008 | Jobs | |
| 2008/0222540 A1 | 9/2008 | Schulz | |
| 2008/0276273 A1 | 11/2008 | Billmaier | |
| 2009/0007017 A1 | 1/2009 | Anzures | |
| 2009/0007188 A1 | 1/2009 | Omernick | |
| 2009/0061837 A1 | 3/2009 | Chaudhri | |
| 2009/0070710 A1 | 3/2009 | Kagaya | |
| 2009/0100373 A1 | 4/2009 | Pixley | |
| 2009/0132921 A1* | 5/2009 | Hwangbo et al. | 715/716 |
| 2009/0172532 A1 | 7/2009 | Chaudhri | |
| 2009/0172543 A1* | 7/2009 | Cronin et al. | 715/721 |
| 2009/0199091 A1 | 8/2009 | Covington | |
| 2009/0201270 A1 | 8/2009 | Pikkujamsa | |
| 2009/0204928 A1* | 8/2009 | Kallio et al. | 715/799 |
| 2009/0228782 A1 | 9/2009 | Fraser | |
| 2009/0228832 A1 | 9/2009 | Cheng | |
| 2009/0249239 A1 | 10/2009 | Eilers | |
| 2009/0271703 A1 | 10/2009 | Chu | |
| 2009/0288032 A1 | 11/2009 | Chang | |
| 2009/0300548 A1 | 12/2009 | Sullivan | |
| 2009/0309846 A1 | 12/2009 | Trachtenberg | |
| 2010/0060666 A1 | 3/2010 | Fong | |
| 2010/0097338 A1 | 4/2010 | Miyashita | |
| 2010/0114991 A1* | 5/2010 | Chaudhary et al. | 707/809 |
| 2010/0122195 A1 | 5/2010 | Hwang | |
| 2010/0122214 A1 | 5/2010 | Sengoku | |
| 2010/0174993 A1 | 7/2010 | Pennington | |
| 2010/0199180 A1 | 8/2010 | Brichter | |
| 2010/0277496 A1 | 11/2010 | Kawanishi | |
| 2010/0287494 A1 | 11/2010 | Ording | |
| 2010/0313125 A1* | 12/2010 | Fleizach et al. | 715/702 |
| 2011/0035703 A1 | 2/2011 | Negishi | |
| 2011/0063248 A1 | 3/2011 | Yoon | |
| 2011/0074699 A1 | 3/2011 | Marr | |
| 2011/0122078 A1 | 5/2011 | Kasahara | |
| 2011/0122159 A1 | 5/2011 | Bergsten | |
| 2011/0157051 A1 | 6/2011 | Shohga | |
| 2011/0161818 A1 | 6/2011 | Viljamaa | |
| 2011/0163969 A1 | 7/2011 | Anzures | |
| 2011/0163971 A1* | 7/2011 | Wagner et al. | 345/173 |
| 2011/0167380 A1 | 7/2011 | Stallings | |
| 2011/0185314 A1 | 7/2011 | Sahai | |
| 2011/0187655 A1 | 8/2011 | Min | |
| 2011/0202834 A1 | 8/2011 | Mandryk | |
| 2011/0209100 A1 | 8/2011 | Hinckley | |
| 2011/0234615 A1 | 9/2011 | Hanson | |
| 2011/0246614 A1 | 10/2011 | Votaw | |
| 2011/0276863 A1 | 11/2011 | Bhise | |
| 2011/0296344 A1 | 12/2011 | Habib | |
| 2011/0302532 A1 | 12/2011 | Missig | |
| 2012/0005623 A1 | 1/2012 | Ishak | |
| 2012/0026611 A1 | 2/2012 | Hu | |
| 2012/0047432 A1 | 2/2012 | Yalovsky | |
| 2012/0054684 A1 | 3/2012 | Gossweiler | |
| 2012/0070017 A1 | 3/2012 | Dorogusker | |
| 2012/0084662 A1 | 4/2012 | Navarro | |
| 2012/0105489 A1* | 5/2012 | Monroe | G06F 3/0482 345/684 |
| 2012/0131516 A1 | 5/2012 | Chiu | |

(56) References Cited

U.S. PATENT DOCUMENTS

| | | |
|---|---|---|
| 2012/0148088 A1 | 6/2012 | Mital |
| 2012/0159381 A1 | 6/2012 | Tseng |
| 2012/0159393 A1 | 6/2012 | Sethi |
| 2012/0192101 A1 | 7/2012 | Migos |
| 2012/0192118 A1 | 7/2012 | Migos |
| 2012/0227002 A1 | 9/2012 | Tiwari |
| 2012/0233565 A1 | 9/2012 | Grant |
| 2012/0233573 A1 | 9/2012 | Sullivan |
| 2012/0266068 A1 | 10/2012 | Ryman |
| 2012/0266104 A1 | 10/2012 | Shah |
| 2012/0266130 A1 | 10/2012 | Kinnucan |
| 2012/0272171 A1 | 10/2012 | Icho |
| 2012/0272181 A1 | 10/2012 | Rogers |
| 2012/0311438 A1 | 12/2012 | Cranfill |
| 2012/0327009 A1 | 12/2012 | Fleizach |
| 2013/0019263 A1 | 1/2013 | Ferren |
| 2013/0067510 A1 | 3/2013 | Ahanger |
| 2013/0073932 A1* | 3/2013 | Migos et al. ............ 715/201 |
| 2013/0104017 A1 | 4/2013 | Ko |
| 2013/0135309 A1 | 5/2013 | King |
| 2013/0183943 A1 | 7/2013 | Tow |
| 2013/0194269 A1 | 8/2013 | Matas |
| 2013/0194307 A1 | 8/2013 | Matas |
| 2013/0198261 A1 | 8/2013 | Matas |
| 2013/0198631 A1 | 8/2013 | Matas |
| 2013/0198634 A1 | 8/2013 | Matas |
| 2013/0198663 A1 | 8/2013 | Matas |
| 2013/0198664 A1 | 8/2013 | Matas |
| 2013/0198665 A1 | 8/2013 | Matas |
| 2013/0198666 A1 | 8/2013 | Matas |
| 2013/0198668 A1 | 8/2013 | Matas |
| 2013/0198681 A1 | 8/2013 | Matas |
| 2013/0198682 A1 | 8/2013 | Matas |
| 2013/0198683 A1 | 8/2013 | Matas |
| 2013/0205210 A1 | 8/2013 | Jeon |
| 2013/0227494 A1 | 8/2013 | Matas |
| 2013/0307792 A1 | 11/2013 | Andres |
| 2013/0314341 A1 | 11/2013 | Lee |
| 2013/0339907 A1 | 12/2013 | Matas |
| 2013/0346906 A1 | 12/2013 | Farago |
| 2014/0013283 A1 | 1/2014 | Matas |
| 2014/0033124 A1 | 1/2014 | Sorrick |
| 2014/0046809 A1 | 2/2014 | Baker |
| 2014/0164985 A1 | 6/2014 | Pimmel |
| 2014/0250358 A1 | 9/2014 | Milener |
| 2014/0258849 A1* | 9/2014 | Chung et al. ............ 715/243 |
| 2014/0282262 A1 | 9/2014 | Gregotski |
| 2014/0282263 A1 | 9/2014 | Pennington |
| 2014/0288686 A1 | 9/2014 | Sant |
| 2015/0026825 A1 | 1/2015 | Dube |
| 2015/0095839 A1 | 4/2015 | Hombert |
| 2015/0100880 A1 | 4/2015 | Matas |
| 2015/0100924 A1 | 4/2015 | Matas |

OTHER PUBLICATIONS

U.S. Appl. No. 14/572,405, filed Dec. 16, 2014, Matas.
Response to Final Office Action for U.S. Appl. No. 13/487,765, Dec. 29, 2014.
Final Office Action for U.S. Appl. No. 13/487,765, Oct. 3, 2014.
Response to Non-Final Office Action for U.S. Appl. No. 13/487,765, Aug. 13, 2014.
Non-Final Office Action for U.S. Appl. No. 13/487,765, Mar. 14, 2014.
Response to Final Office Action for U.S. Appl. No. 13/487,805, Dec. 29, 2014.
Final Office Action for U.S. Appl. No. 13/487,805, Sep. 26, 2014.
Response to Non-Final Office Action for U.S. Appl. No. 13/487,805, Jul. 31, 2014.
Non-Final Office Action for U.S. Appl. No. 13/487,805, Apr. 3, 2014.
Final Office Action for U.S. Appl. No. 13/555,607, Dec. 3, 2014.
Response to Non-Final Office Action for U.S. Appl. No. 13/555,607, Nov. 4, 2014.
Non-Final Office Action for U.S. Appl. No. 13/555,607, Aug. 20, 2014.
Amendment under Rule 312 for U.S. Appl. No. 13/555,657, Dec. 30, 2014.
Notice of Allowance for U.S. Appl. No. 13/555,657, Dec. 5, 2014.
Response to Non-Final Office Action for U.S. Appl. No. 13/555,657, Nov. 19, 2014.
Non-Final Office Action for U.S. Appl. No. 13/555,657, Sep. 18, 2014.
Response to Non-Final Office Action for U.S. Appl. No. 13/555,845, Oct. 24, 2014.
Non-Final Office Action for U.S. Appl. No. 13/555,845, Apr. 24, 2014.
Final Office Action for U.S. Appl. No. 13/488,039, Dec. 12, 2014.
Response to Non-Final Office Action for U.S. Appl. No. 13/488,039, Nov. 7, 2014.
Non-Final Office Action for U.S. Appl. No. 13/488,039, Jun. 11, 2014.
Final Office Action for U.S. Appl. No. 13/555,876, Nov. 20, 2014.
Response to Non-Final Office Action for U.S. Appl. No. 13/555,876, Oct. 23, 2014.
Non-Final Office Action for U.S. Appl. No. 13/555,876, Jul. 14, 2014.
Response to Final Office Action for U.S. Appl. No. 13/490,343, Dec. 19, 2014.
Final Office Action for U.S. Appl. No. 13/490,343, Nov. 7, 2014.
Response to Non-Final Office Action for U.S. Appl. No. 13/490,343, Oct. 22, 2014.
Non-Final Office Action for U.S. Appl. No. 13/490,343, Jun. 4, 2014.
Response to Final Office Action for U.S. Appl. No. 13/488,076, Dec. 29, 2014.
Final Office Action for U.S. Appl. No. 13/488,076, Oct. 3, 2014.
Response to Non-Final Office Action for U.S. Appl. No. 13/488,076, Jul. 31, 2014.
Non-Final Office Action for U.S. Appl. No. 13/488,076, Apr. 1, 2014.
Non-Final Office Action for U.S. Appl. No. 13/555,909, Nov. 14, 2014.
Response to Final Office Action for U.S. Appl. No. 13/555,909, Aug. 8, 2014.
Final Office Action for U.S. Appl. No. 13/555,909, Apr. 28, 2014.
Response to Non-Final Office Action for U.S. Appl. No. 13/555,909, Mar. 27, 2014.
Non-Final Office Action for U.S. Appl. No. 13/555,909, Jan. 2, 2014.
Non-Final Office Action for U.S. Appl. No. 13/490,367, Nov. 20, 2014.
Response to Final Office Action for U.S. Appl. No. 13/490,367, Sep. 19, 2014.
Final Office Action for U.S. Appl. No. 13/490,367, May 1, 2014.
Response to Non-Final Office Action for U.S. Appl. No. 13/490,367, Apr. 4, 2014.
Non-Final Office Action for U.S. Appl. No. 13/490,367, Jan. 3, 2014.
Notice of Allowance for U.S. Appl. No. 13/490,736, Nov. 21, 2014.
Response to Non-Final Office Action for U.S. Appl. No. 13/490,736, Oct. 23, 2014.
Non-Final Office Action for U.S. Appl. No. 13/490,736, Jul. 8, 2014.
Final Office Action for U.S. Appl. No. 13/489,172, Dec. 12, 2014.
Response to Non-Final Office Action for U.S. Appl. No. 13/489,172, Aug. 12, 2014.
Non-Final Office Action for U.S. Appl. No. 13/489,172, Mar. 28, 2014.
Response to Non-Final Office Action for U.S. Appl. No. 13/491,100, Oct. 30, 2014.
Non-Final Office Action for U.S. Appl. No. 13/491,100, Jul. 31, 2014.
Notice of Allowance for U.S. Appl. No. 13/489,265, Nov. 7, 2014.
Response to Non-Final Office Action for U.S. Appl. No. 13/489,265, Oct. 28, 2014.

(56) References Cited

OTHER PUBLICATIONS

Non-Final Office Action for U.S. Appl. No. 13/489,265, May 2, 2014.
Non-Final Office Action for U.S. Appl. No. 13/677,093, Nov. 21, 2014.
Notice of Allowance for U.S. Appl. No. 13/487,765, Sep. 15, 2015.
Response to Final Office Action for U.S. Appl. No. 13/487,765, Jul. 14, 2015.
Final Office Action for U.S. Appl. No. 13/487,765, Jan. 14, 2015.
Response to Final Office Action for U.S. Appl. No. 13/487,805, Nov. 2, 2015.
Final Office Action for U.S. Appl. No. 13/487,805, Jun. 1, 2015.
Response to Non-Final Office Action for U.S. Appl. No. 13/487,805, May 18, 2015.
Non-Final Office Action for U.S. Appl. No. 13/487,805, Jan. 16, 2015.
Notice of Allowance for U.S. Appl. No. 13/555,607, Mar. 4, 2015.
Response to Final Office Action for U.S. Appl. No. 13/555,607, Feb. 12, 2015.
Notice of Allowance for U.S. Appl. No. 13/555,657, Feb. 11, 2015.
Notice of Allowance for U.S. Appl. No. 13/555,845, Jan. 30, 2015.
Notice of Allowance for U.S. Appl. No. 13/555,845, Dec. 19, 2014.
Notice of Allowance for U.S. Appl. No. 13/488,039, Sep. 10, 2015.
Response to Non-Final Office Action for U.S. Appl. No. 13/488,039, Aug. 7, 2015.
Non-Final Office Action for U.S. Appl. No. 13/488,039, Apr. 24, 2015.
Response to Final Office Action for U.S. Appl. No. 13/488,039, Mar. 17, 2015.
Final Office Action for U.S. Appl. No. 13/555,876, Sep. 10, 2015.
Response to Final Office Action for U.S. Appl. No. 13/555,876, Aug. 5, 2015.
Non-Final Office Action for U.S. Appl. No. 13/555,876, Apr. 30, 2015.
Response to Final Office Action for U.S. Appl. No. 13/555,876, Mar. 23, 2015.
Notice of Allowance for U.S. Appl. No. 13/490,343, Jan. 29, 2015.
Notice of Allowance for U.S. Appl. No. 13/490,343, Jan. 14, 2015.
Notice of Allowance for U.S. Appl. No. 13/488,076, Aug. 31, 2015.
Response to Non-Final Office Action for U.S. Appl. No. 13/488,076, Jul. 15, 2015.
Non-Final Office Action for U.S. Appl. No. 13/488,076, Jan. 15, 2015.
Notice of Allowance for U.S. Appl. No. 13/555,909, Jun. 24, 2015.
Notice of Allowance for U.S. Appl. No. 13/555,909, Jun. 3, 2015.
Response to Non-Final Office Action for U.S. Appl. No. 13/555,909, Mar. 4, 2015.
Response to Final Office Action for U.S. Appl. No. 13/490,367, Oct. 20, 2015.
Final Office Action for U.S. Appl. No. 13/490,367, May 21, 2015.
Response to Non-Final Office Action for U.S. Appl. No. 13/490,367, Mar. 19, 2015.
Notice of Allowance for U.S. Appl. No. 13/490,736, Feb. 25, 2015.
Non-Final Office Action for U.S. Appl. No. 13/489,172, Oct. 7, 2015.
Response to Final Office Action for U.S. Appl. No. 13/489,172, Feb. 12, 2015.
Notice of Allowance for U.S. Appl. No. 13/491,100, Sep. 18, 2015.
Response to Non-Final Office Action for U.S. Appl. No. 13/491,100, Aug. 28, 2015.
Non-Final Office Action for U.S. Appl. No. 13/491,100, May 29, 2015.
Response to Final Office Action for U.S. Appl. No. 13/491,100, May 18, 2015.
Final Office Action for U.S. Appl. No. 13/491,100, Feb. 27, 2015.
Notice of Allowance for U.S. Appl. No. 13/489,265, Jan. 30, 2015.
Non-Final Office Action for U.S. Appl. No. 13/677,093, Oct. 5, 2015.
Response to Final Office Action for U.S. Appl. No. 13/677,093, Aug. 13, 2015.
Final Office Action for U.S. Appl. No. 13/677,093, May 28, 2015.
Response to Non-Final Office Action for U.S. Appl. No. 13/677,093, Mar. 19, 2015.
Borst, C. et al., "A Spring Model for Whole-Hand Virtual Grasping," Presence, vol. 15, No. 1, pp. 47, 61, Feb. 2006, doi: 10.1162/pres.2006.15.1.47, http://ieeexplore.ieee.org/stamp/stamp.jsp?tp=&arnumber=6797721&isnumber=6797198, Jun. 3, 2015.

\* cited by examiner

HIERARCHICAL USER INTERFACE

PRIORITY

This application is a continuation-in-part, under 35 U.S.C. §120, of U.S. patent application Ser. No. 13/487,805, filed on 4 Jun. 2012, which claims the benefit, under 35 U.S.C. §119(e), of U.S. Provisional Patent Application No. 61/593,841, filed on 1 Feb. 2012, each of which is incorporated herein by reference.

TECHNICAL FIELD

This disclosure generally relates to a user interface.

BACKGROUND

A user interface (UI), in the industrial design field of human-machine interaction, is the space where interactions between humans and machines occur. The goal of the interactions between a human, often referred to as a "user", and a machine at the user interface is the user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands.

SUMMARY OF PARTICULAR EMBODIMENTS

In particular embodiments, a user interface for presenting content to users may have a hierarchical structure. The user interface may have any number of content sections, and each content section may have any number of content items. The content items may be of any type or format. A user may consume or interact with some of the content items. In particular embodiments, each content item may correspond to a user-interface element.

In particular embodiments, the content sections and content items have a hierarchical relationship. When the user interface is displayed, the content sections are displayed at a lower level, and the content items are displayed at one or more higher levels above the level where the content sections are displayed.

In particular embodiments, when the user interface is displayed on different platforms (e.g., notebook computer, tablet computer, Smartphone, etc.), the layout of the user interface may be automatically adjusted to suit the individual platforms. More specifically, the layout of the content sections or content items may be adjusted based on the size, orientation, or aspect ratio of the screen of the electronic device on which the user interface is displayed. In some embodiments, the content items of each content section may be selected based on the individual platforms.

DESCRIPTION OF EXAMPLE EMBODIMENTS

A user interface (UI) may be incorporated into any type of software applications, including, for example, desktop applications, mobile applications, or web-based applications, to enable users to interact with and control the applications. A graphical user interface (GUI) is a type of user interface that enables users to interact with software applications through multimedia objects, including, for example, icons, buttons, menus, images, video, or audios.

Figure 1:
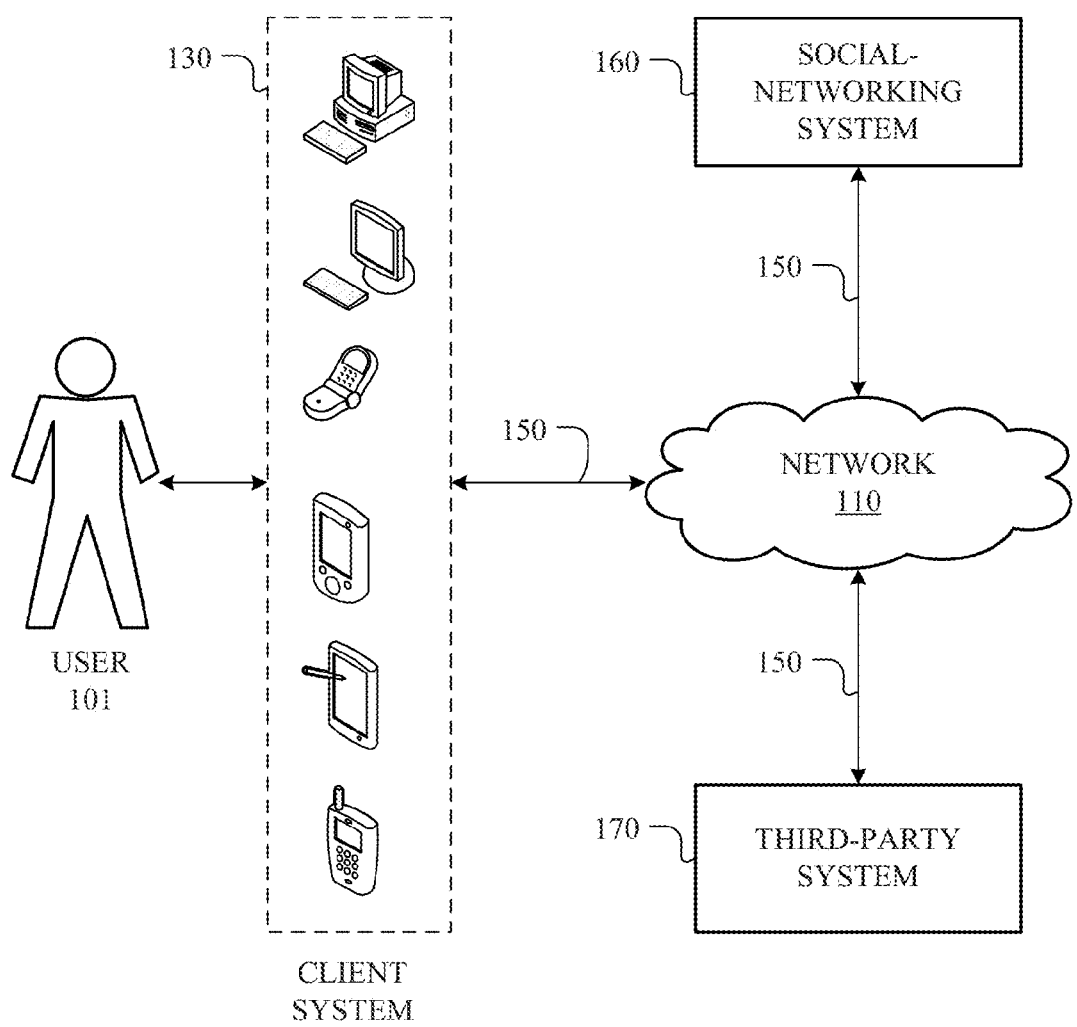
FIG. 1 illustrates an example network environment associated with a social-networking system.

In particular embodiments, a software application may be associated with a social-networking system. FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various third-party software applications (e.g., web-based applications). Third-party system 170 may generate, store, receive, and transmit various types of data, such as, for example, texts, images, videos, or audios. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, data (e.g., data representing various types of information or content) may be sent between servers associated with social-networking system 160 and individual client systems 130 via network 110. When two electronic devices (e.g., a server and a client) are connected to a network (e.g., a computer or communications network, such as network 110), data may be transmitted between the two devices over the network using one or more suitable network protocols. A network may include any number of sub-networks. By transmitting data between the two devices, the two devices may communicate with each other.

In network communications, there are two ways to send a communication (i.e., data) from one device to another device: push and pull. With push technology, the request for the communication transaction is initiated by the sending device. That is, the sending device "pushes" the communication, so to speak, to the receiving device. In this case, the sending device may be considered the active party and the receiving device may be considered the passive party in the transaction. In contrast, with pull technology, the request for the communication transaction is initiated by the receiving device. That is, the receiving device "pulls" the communication, so to speak, from the sending device. In this case, the sending device may be considered the passive party and the receiving device may be considered the active party in the transaction. In particular embodiments, a server associated with social-networking system 160 may push data to a client system 130. A communication pushed from a server to a client may be referred to as a "push notification". Similarly, a client system 130 may push data to a server associated with social-networking system 160.

In particular embodiments, a client system 130 may be a mobile electronic or computing device. A mobile electronic device—such as a Smartphone, tablet computer, or laptop computer—may include functionality for determining its location, direction, or orientation, such as a GPS receiver, compass, or gyroscope. Such a mobile device may also include functionality for wireless communication, such as BLUETOOTH communication, near-field communication (NFC), or infrared (IR) communication or communication with a wireless local area networks (WLANs) or cellular-telephone network. Such a mobile device may also include one or more cameras, scanners, touchscreens, microphones, or speakers. Mobile electronic devices may also execute software applications, such as games, web browsers, or social-networking applications. With social-networking applications, users may connect, communicate, and share information with other users in their social networks.

Figure 2A:
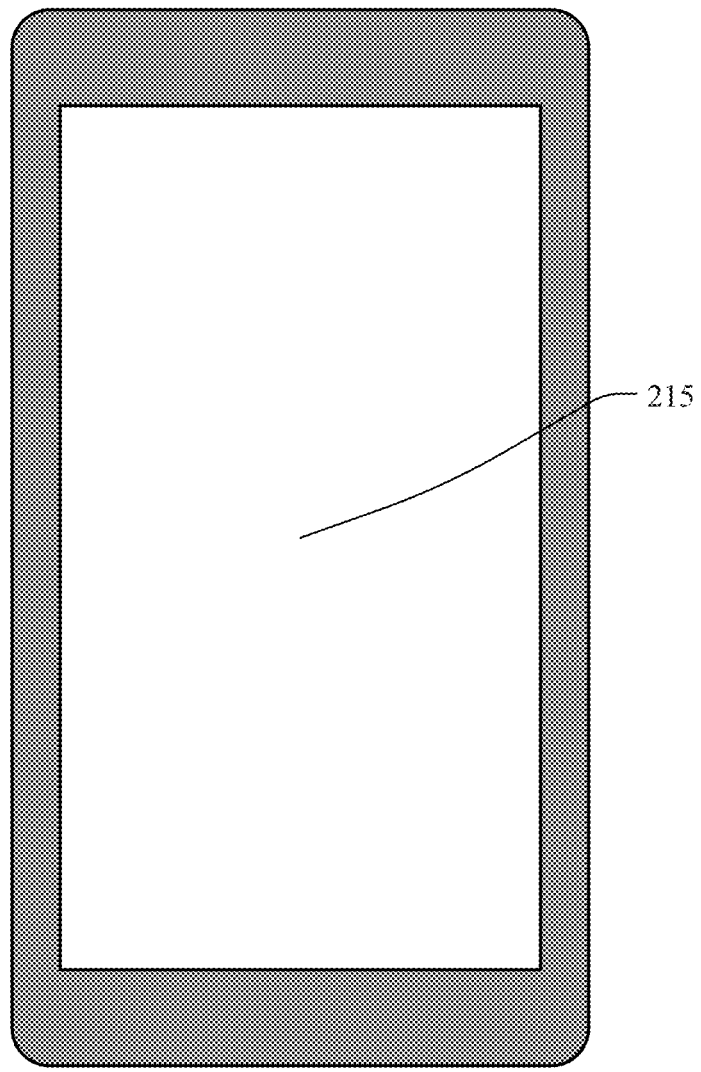
FIGS. 2A and 2B illustrate two example mobile electronic devices.

In particular embodiments, a mobile electronic device (e.g., Smartphone or tablet computer) may include a touchscreen capable of receiving touch input. FIG. 2A illustrates an example mobile electronic device 210 (e.g., a Smartphone) having a touchscreen 215. Touchscreen 215 may incorporate one or more touch sensors and a touch-sensor controller for detecting the presence and location of a touch (e.g., from a user's finger) or the proximity of an object (e.g., a stylus). In particular embodiments, a specific touch detected via touchscreen 215 may result in a touch input event.

Figure 2B:
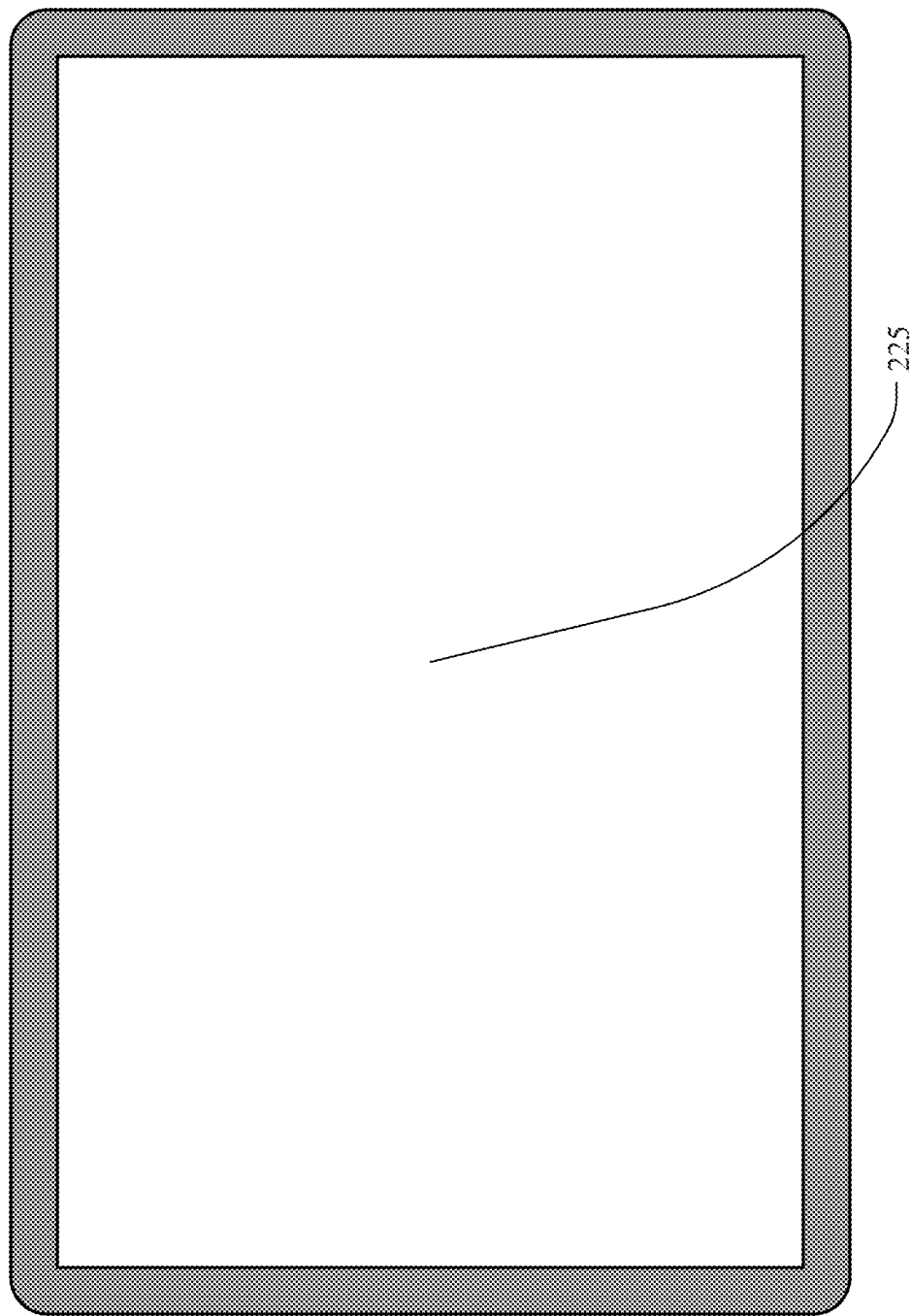

Different mobile electronic devices may have different designs. As a result, the size, shape, or aspect ration of the touchscreens of different mobile devices may differ. FIG. 2B illustrates another example mobile electronic device 220 (e.g., a tablet computer) having a touchscreen 225. Similarly, touchscreen 225 may incorporate one or more touch sensors and a touch-sensor controller for detecting the presence and location of a touch (e.g., from a user's finger) or the proximity of an object (e.g., a stylus). A specific touch detected via touchscreen 225 may result in a touch input event. However, since mobile electronic devices 210 and 220 are two different types of devices, their respective touchscreen 215 and 225 have different sizes and aspect ratios.

There may be various types of touches or gestures, such as single tap, double tap, short press, long press, slide, swipe, flip, pinch open, or pinch close, corresponding to various types of touch input events. Different touch input events may result in different responses and this disclosure contemplates any applicable gesture.

Social-networking system 160 may store various types of data including, for example, user data, application data, or social data. In particular embodiments, such data may be stored in a graph having any number of nodes and edges, where each edge connects two nodes. The graph is often referred to as a "social graph" or "open graph" as it contains, among others, social information.

Figure 3:
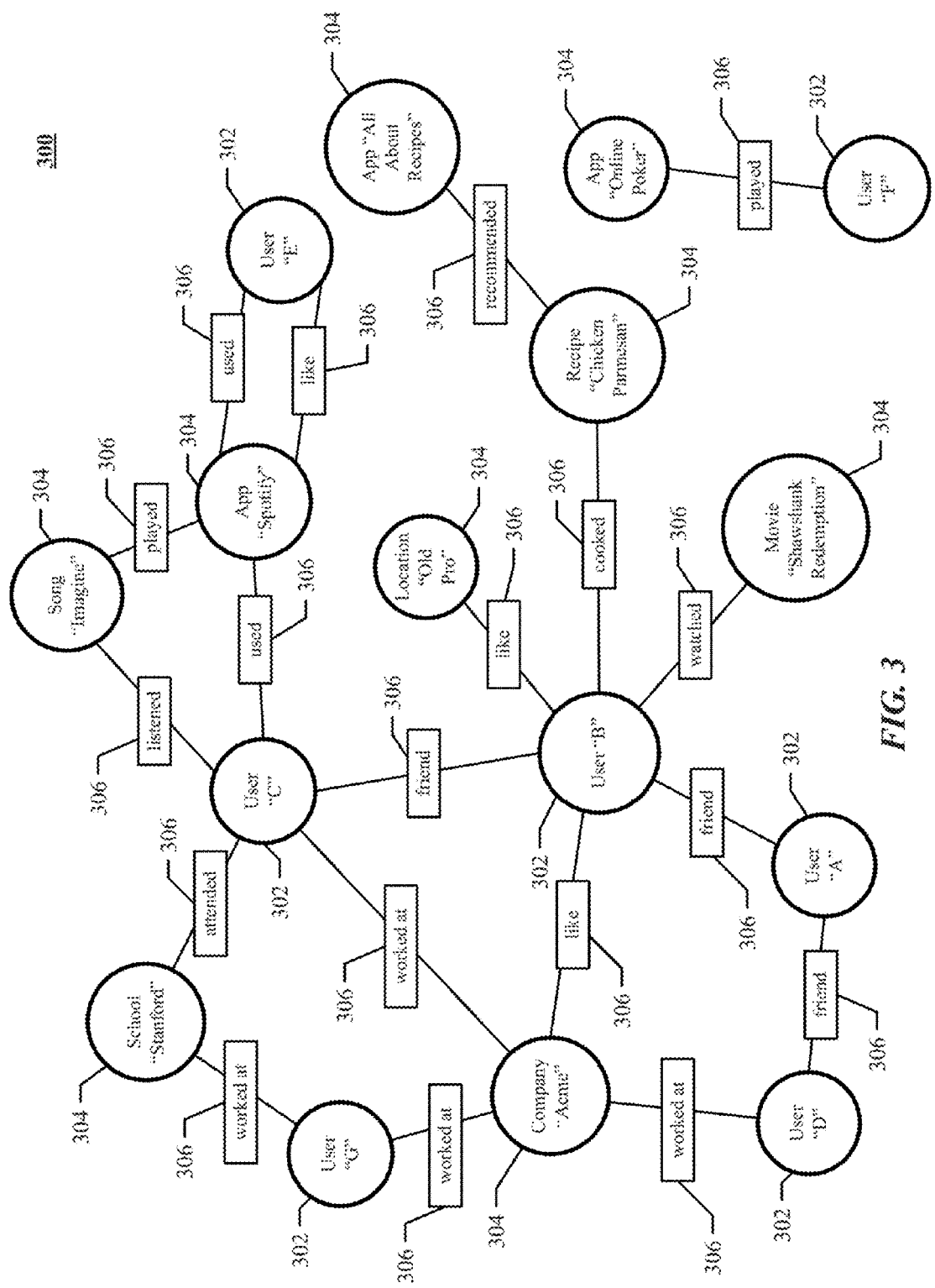
FIG. 3 illustrates an example social graph.

FIG. 3 illustrates example social graph 300. In particular embodiments, social-networking system 160 may store one or more social graphs 300 in one or more data stores. In particular embodiments, social graph 300 may include multiple nodes—which may include multiple user nodes 302 or multiple concept nodes 304—and multiple edges 306 connecting the nodes. Example social graph 300 illustrated in FIG. 3 is shown, for didactic purposes, in a two-dimensional visual map representation. In particular embodiments, a social-networking system 160, client system 130, or third-party system 170 may access social graph 300 and related social-graph information for suitable applications. The nodes and edges of social graph 300 may be stored as data objects, for example, in a data store (such as a social-graph database). Such a data store may include one or more searchable or queryable indexes of nodes or edges of social graph 300.

In particular embodiments, a user node 302 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 302 corresponding to the user, and store the user node 302 in one or more data stores. Users and user nodes 302 described herein may, where appropriate, refer to registered users and user nodes 302 associated with registered users. In addition or as an alternative, users and user nodes 302 described herein may, where appropriate, refer to users that have not registered with social-networking system 160. In particular embodiments, a user node 302 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 302 may be associated with one or more data objects corresponding to information associated with a user. In particular embodiments, a user node 302 may correspond to one or more webpages.

In particular embodiments, a concept node 304 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 304 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 304 may be associated with one or more data objects corresponding to information associated with concept node 304. In particular embodiments, a concept node 304 may correspond to one or more webpages.

In particular embodiments, a node in social graph 300 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 304. Profile pages may be viewable by all or a selected subset of other users. As an example and not by way of limitation, a user node 302 may have a corresponding user-profile page in which the corresponding user may add content, make declarations, or otherwise express himself or herself. As another example and not by way of limitation, a concept node 304 may have a corresponding concept-profile page in which one or more users may add content, make declarations, or express themselves, particularly in relation to the concept corresponding to concept node 304.

In particular embodiments, a concept node 304 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 302 corresponding to the user and a concept node 304 corresponding to the third-party webpage or resource and store edge 306 in one or more data stores.

In particular embodiments, a pair of nodes in social graph 300 may be connected to each other by one or more edges 306. An edge 306 connecting a pair of nodes may represent a relationship between the pair of nodes. In particular embodiments, an edge 306 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 306 connecting the first user's user node 302 to the second user's user node 302 in social graph 300 and store edge 306 as social-graph information in one or more data stores (e.g., data stores associated with social-networking system 160). In the example of FIG. 3, social graph 300 includes an edge 306 indicating a friend relation between user nodes 302 of user "A" and user "B" and an edge indicating a friend relation between user nodes 302 of user "C" and user "B." Although this disclosure describes or illustrates particular edges 306 with particular attributes connecting particular user nodes 302, this disclosure contemplates any suitable edges 306 with any suitable attributes connecting user nodes 302. As an example and not by way of limitation, an edge 306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 300 by one or more edges 306.

In particular embodiments, an edge 306 between a user node 302 and a concept node 304 may represent a particular action or activity performed by a user associated with user node 302 toward a concept associated with a concept node 304. As an example and not by way of limitation, as illustrated in FIG. 3, a user may "like," "attended," "played," "listened," "cooked," "worked at," or "watched" a concept, each of which may correspond to a edge type or subtype. A concept-profile page corresponding to a concept node 304 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 306 and a "used" edge (as illustrated in FIG. 3) between user nodes 302 corresponding to the user and concept nodes 304 corresponding to the song and application to indicate that the user listened to the song and used the application. Moreover, social-networking system 160 may create a "played" edge 306 (as illustrated in FIG. 3) between concept nodes 304 corresponding to the song and the application to indicate that the particular song was played by the particular application. In this case, "played" edge 306 corresponds to an action performed by an external application (SPOTIFY) on an external audio file (the song "Imagine"). Although this disclosure describes particular edges 306 with particular attributes connecting user nodes 302 and concept nodes 304, this disclosure contemplates any suitable edges 306 with any suitable attributes connecting user nodes 302 and concept nodes 304. Moreover, although this disclosure describes edges between a user node 302 and a concept node 304 representing a single relationship, this disclosure contemplates edges between a user node 302 and a concept node 304 representing one or more relationships.

As an example and not by way of limitation, an edge 306 may represent both that a user likes and has used at a particular concept. Alternatively, another edge 306 may represent each type of relationship (or multiples of a single relationship) between a user node 302 and a concept node 304 (as illustrated in FIG. 3 between user node 302 for user "E" and concept node 304 for "SPOTIFY").

In particular embodiments, social-networking system 160 may create an edge 306 between a user node 302 and a concept node 304 in social graph 300. As an example and not by way of limitation, a user viewing a concept-profile page (such as, for example, by using a web browser or a special-purpose application hosted by the user's client system 130) may indicate that he or she likes the concept represented by the concept node 304 by clicking or selecting a "Like" icon, which may cause the user's client system 130 to transmit to social-networking system 160 a message indicating the user's liking of the concept associated with the concept-profile page. In response to the message, social-networking system 160 may create an edge 306 between user node 302 associated with the user and concept node 304, as illustrated by "like" edge 306 between the user and concept node 304. In particular embodiments, social-networking system 160 may store an edge 306 in one or more data stores. In particular embodiments, an edge 306 may be automatically formed by social-networking system 160 in response to a particular user action. As an example and not by way of limitation, if a first user uploads a picture, watches a movie, or listens to a song, an edge 306 may be formed between user node 302 corresponding to the first user and concept nodes 304 corresponding to those concepts. Although this disclosure describes forming particular edges 306 in particular manners, this disclosure contemplates forming any suitable edges 306 in any suitable manner.

In particular embodiments, a set of objects may be organized into a hierarchy based on, for example, how the individual objects are related to each other. An object hierarchy may have any number of levels, and at each level, there may be any number of objects. Parent-child or sibling relationships may exist between specific objects in the hierarchy. Within an object hierarchy, a parent object is one level above the level of its child objects. Two sibling objects are at the same level and share the same parent object. In addition, any portion of the hierarchy may also be considered a hierarchy in itself.

Figure 4:
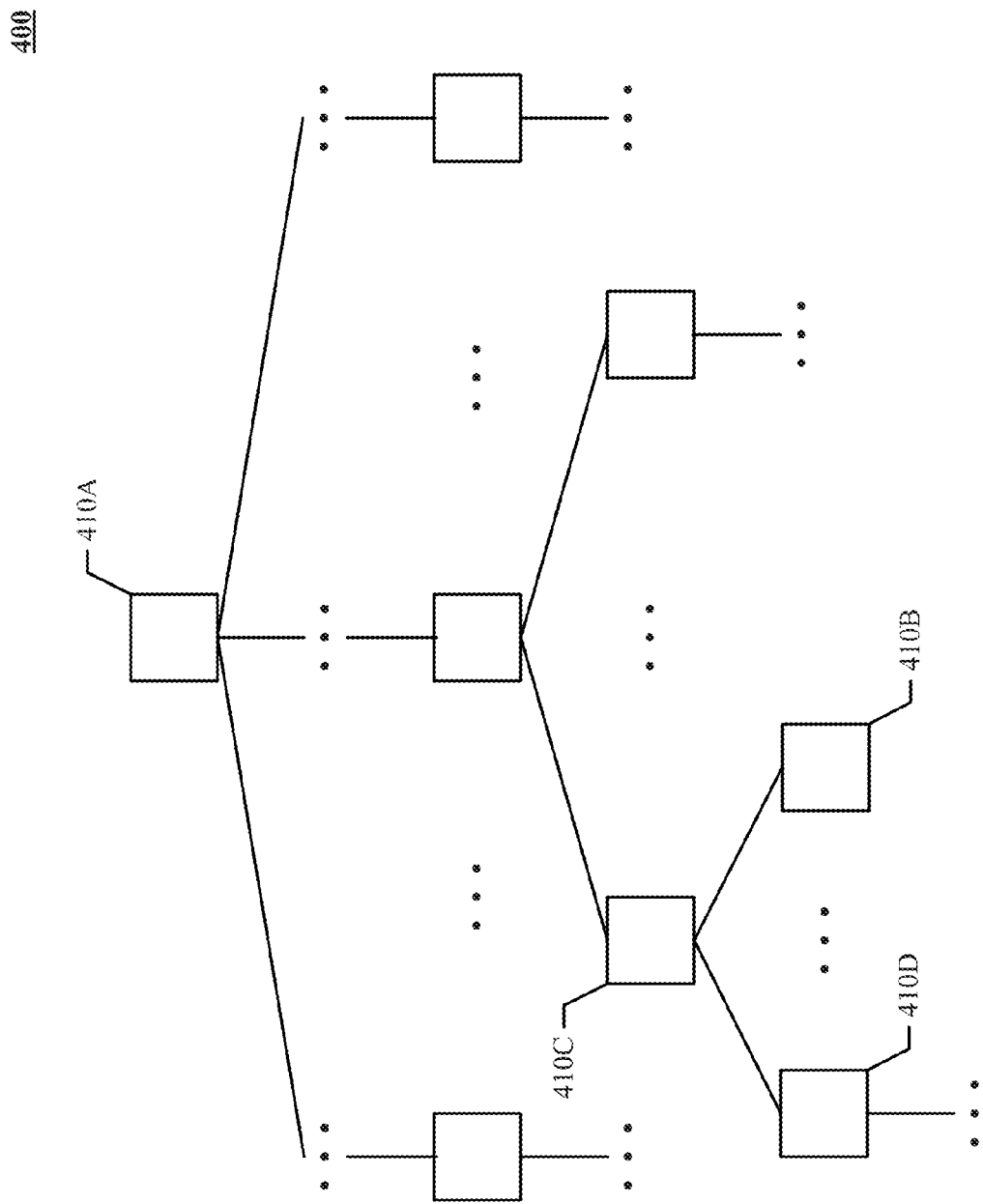
FIG. 4 illustrates an example object hierarchy.

FIG. 4 illustrates a portion of an example object hierarchy 400 that includes a number of objects 410. FIG. 4 is in fact a visual representation of an object hierarchy. Each node represents a specific object in the hierarchy, and each edge connecting two nodes represents a parent-child relationship between the two corresponding objects.

In particular embodiments, an object in a hierarchy may or may not have a parent. If an object does not have a parent, it may be referred to as a "root" object (e.g., object 410A). Typically, the root object is positioned at the first or topmost level of the hierarchy. In particular embodiments, an object in a hierarchy may or may not have any children. If an object does not have any children, it may be referred to as a "leaf" or "terminal" object (e.g., object 410B). If an object does have children (e.g., object 410C), it may have any number of children. In addition, objects sharing the same parent may be referred to as each other's "siblings". For example, in FIG. 4, object 410C is the parent of objects 410D and 410B. Objects 410D and 410B are the children of object 410C and are siblings to each other. Thus, a hierarchy of objects (e.g., object hierarchy 400) not only includes the individual objects (e.g., objects 410) themselves but also indicates the relationships among the specific objects. Moreover, the position of a specific object within the hierarchy may indicate its relationships with other objects in the hierarchy.

Objects 410 may be of various types, and this disclosure contemplates any applicable object types. For example and without limitation, the term "object" may refer to any type of content, including but not limited to images, videos, captions, text blocks or boxes, user-interface elements, clickable links, newsfeed stories, references to other objects, advertisements, calendar events, units for displaying open graph analysis that may be graphically rendered, applications, websites, web pages, books, chapters. In particular embodiments, given a hierarchy of objects, which may be a portion of another, larger hierarchy of objects, the hierarchical relationships (e.g., parent-child or sibling relationships, positions of the objects within the hierarchy) between specific objects may direct some aspects of how these objects behave in the context of a user interface or how the objects are presented to a user.

As an example, in the context of the desktop of a computing device, the desktop may be a parent object, and sometimes the root object of a hierarchy, whose child objects are the individual software applications available on the desktop. A software application, while itself being one of the child objects of the desktop, is also the parent object of the individual components of that software application. Different software applications may include different components. For example, for a software application that manages digital books (e.g., a book reader application), its components may include the digital books available, the individual chapters of each book, the pages of each chapter, and the texts, images, videos, audios, or other content or media elements on each page. Each of these also corresponds to an object (e.g., user-interface component) in the hierarchy. More specifically, within the hierarchy, the digital book application may be the parent object of the digital books. A digital book may be the parent object of the individual chapters of that book. A chapter, while itself being one of the child objects of the book, is also the parent object of the pages in that chapter. A page is the parent object of the texts, images, videos, audios, or other content or media elements on that page. A text block, image, video, audio, or other content or media element is one of the child objects of the page to which it belongs. Similarly, for a software application that manages news feeds, its components may include the individual news channels and the news stories within each channel. Each of these may correspond to an object. Within the hierarchy, the news-feed application, while itself being one of the child objects of the desktop, is also the parent object of the news channels. A news channel in turn is the parent object of the news stories included in that channel.

As another example, in the context of the Internet or the World Wide Web, the Internet may be a parent object whose child objects are the individual websites. A website, while itself being one of the child objects of the Internet, is also the parent object of the individual web pages of that website. A web page, while itself being one of the child objects of the website to which it belongs, is the parent object of the texts, images, videos, audios, or links (e.g., Uniform Resource Locators (URLs)) included in the web page. Each text block, image, video, audio, or link may also correspond to a specific object in the hierarchy.

As a third example, a website, such as a social-networking website implemented by social-networking system 160, may also be arranged in a hierarchical structure for navigating the content of the social-networking website. In this context, the social-networking website may be a parent object whose child objects are the components (e.g., photo albums, user profile pages, etc.) of the website. For example, a photo album, while itself being a child object of the social-networking website, may in turn be a parent object, and the individual photos within the album may be the child objects of the photo album. A user's profile page may be structured in such a hierarchical fashion as well. The profile page itself may be considered a parent object, and the individual objects on the profile page may be the child objects of the profile page. In particular embodiments, a profile page may be considered and rendered (e.g., for presentation to a user) as a linear timeline of objects, such as, for example and without limitation, photos, photo albums, check-ins, comments from other users, attended events, tags, applications the user has added to the profile page, stories, songs the user has listened to, playlists. These various types of objects may all be children of the profile page, or may be further arranged into multiple levels. With some implementations, a user's profile page may include any number of sections, such as the user's education and employment information, the user's public "wall", or the user's social connections. Then the various types of objects above may be divided into specific sections.

In particular embodiments, an object 410 may be a component of a user interface. In this case, object hierarchy 400 may correspond to the user interface, and each object 410 may correspond to a specific component of the user-interface. A user interface may have various types of components, and this disclosure contemplates any applicable user-interface component types. For example, a user-interface component (i.e., an object 410) may be a window, a section, a tab, an image, a video, an audio, a text block, a menu, an icon, a button, a checkbox, a website, a web page, a frame, a clickable link, a message, a post, or an input field. In particular embodiments, an object 410 may be consumed by a user if the user is able to, for example and without limitation, interact with, view, read, listen to, manipulate, or handle the object 410. For example, some user-consumable objects 410 may be texts, images, videos, audios, feeds, executables (e.g., application programs or games), websites, web pages, digital books, photo albums, posts, or messages.

In particular embodiments, when the user interface corresponding to object hierarchy 400 is displayed (e.g., on a client system 130), the structure of the corresponding object hierarchy 400 may reflect the structure of the user interface. The relationships among the individual components in the user interface, as reflected in object hierarchy 400, may influence how these components are organized and presented to users. The user interface may have any number of layers, respectively corresponding to the individual levels of object hierarchy 400. Objects 410 (e.g., user-interface components) at a specific level of object hierarchy 400 are displayed in the corresponding layer of the user interface. With some implementations, the lowest or bottommost layer of the user interface corresponds to the first or topmost level of object hierarchy 400. Thus, root object 410A is displayed in the lowest layer of the user interface. Furthermore, in the user interface, each object 410 (e.g., user-interface component) is displayed in a layer immediately above the layer where its parent, if one exists, is displayed and immediately below the layer where its children, if any, are displayed. Sibling objects 410 are displayed at the same layer. Thus, the position of a component in the user interface indicates its relationships (e.g., parent-child or sibling) with other components in the user interface.

Figure 5C:
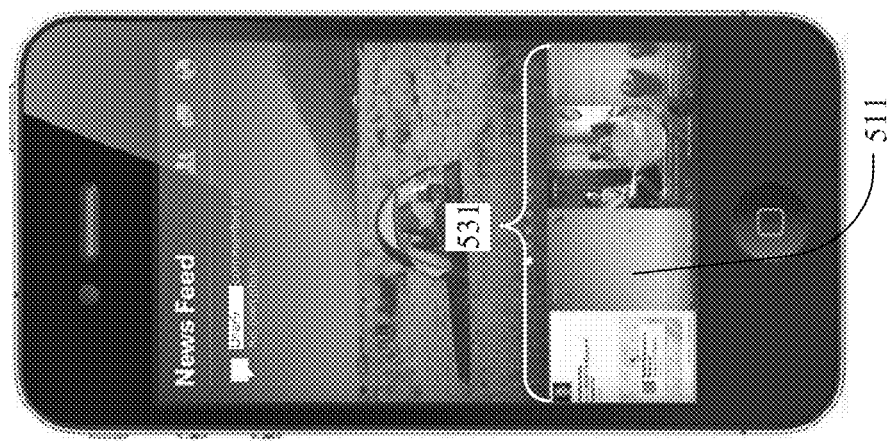
FIGS. 5A-5C illustrate example display modes.
Figure 5B:
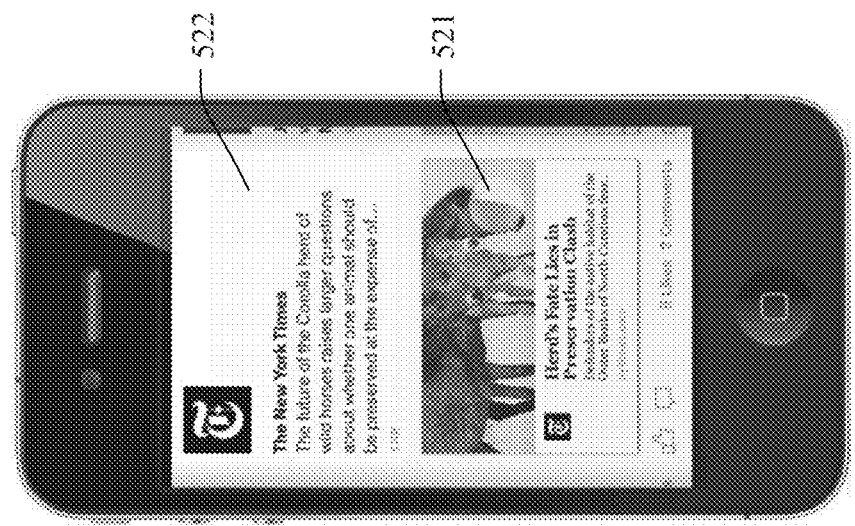
Figure 5A:
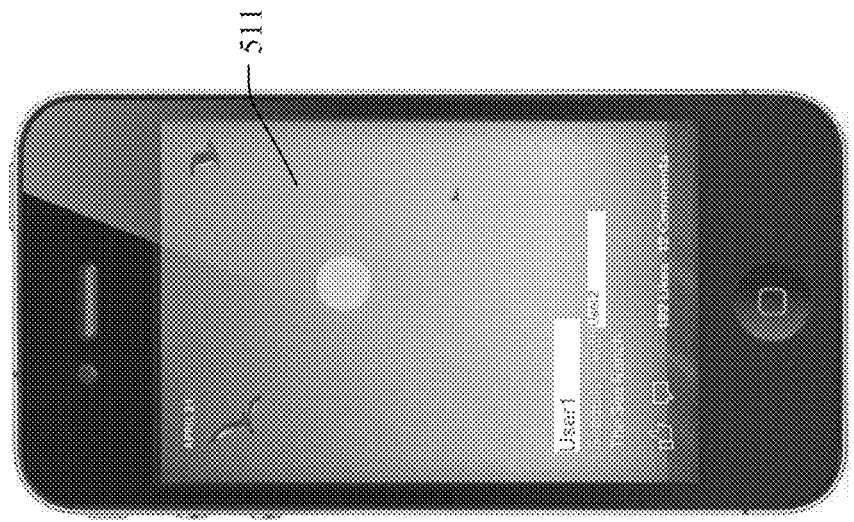

In particular embodiments, a user-interface component (e.g., an image, a video, a folder, etc.) may be displayed in various display modes. As an example, the user-interface component may be displayed in a "full-screen" mode, where the user-interface component occupies the entire or nearly the entire display area (e.g., the screen of an electronic device). FIG. 5A illustrates an example image 511 displayed in the full-screen mode on the screen of a mobile device (e.g., a Smartphone). As another example, the user-interface component may be displayed in an "on-page" mode, where the user-interface component is included in another user-interface component and displayed as a part of that other user-interface component (e.g., an image is displayed as a part of a web page). FIG. 5B illustrates an example image 521 displayed in the on-page mode. Here, image 521 is included in a web page 522 and is a component of web page 522. As a third example, the user-interface component may be displayed in an "index" mode, where the user-interface component is a part of a series of user-interface components (e.g., an image is displayed together with other images from the same album, or a chapter of a book is displayed in the table of content of the book together with other chapters from the same book). FIG. 5C illustrates image 511 displayed in the index mode. Here, image 511 is a part of a series of user interface components 531.

In particular embodiments, a hierarchical user interface may be used to present content to a user. Such a user interface may be referred to as a "content feed" or "news feed" user interface. The content may be of any type and format, such as, for example and without limitation, text, icon, image, video, audio, web page, post, or message. This disclosure contemplates any applicable content type and format. In particular embodiments, the individual content items (e.g., text, image, video, audio, web page, post, message, news piece, etc.) may be organized into various categories, referred to as content sections. For example, related content items may be categorized into the same content section. The user interface may include any number of content sections, and each content section may include any number of content items. Hierarchically, a content section may be the parent of the content items belonging to that section. For example, various photos taken during a holiday trip may be organized into the same album, and various photo albums may be organized into the photo section of the user interface.

In particular embodiments, a user may consume or interact with a specific content item. For example, a user consumes a content item when the user scrolls, opens up, views, listens to, selects, reviews, or comments on the content item. A user interacts with a content item when the user selects, clicks on, taps, reviews, or comments on the content item. This disclosure contemplates any applicable means for a user to consume or interact with a content item.

Given a hierarchical user interface having various content sections and each content section having various content items, the user interface may be presented on the screens of various types of electronic devices (e.g., notebook computer, tablet computer, Smartphone, etc.). These screens may have different sizes, orientations, or aspect ratios, as illustrated in FIGS. 2A and 2B. In particular embodiments, the layout of the user interface (i.e., how the content sections and content items are presented to a user) may be automatically adjusted based on the type of electronic device and more specifically, the size, orientation, or aspect ratio of the screen of the electronic device on which the user interface is displayed so that the layout is more suitable for that electronic device.

Figure 6A:
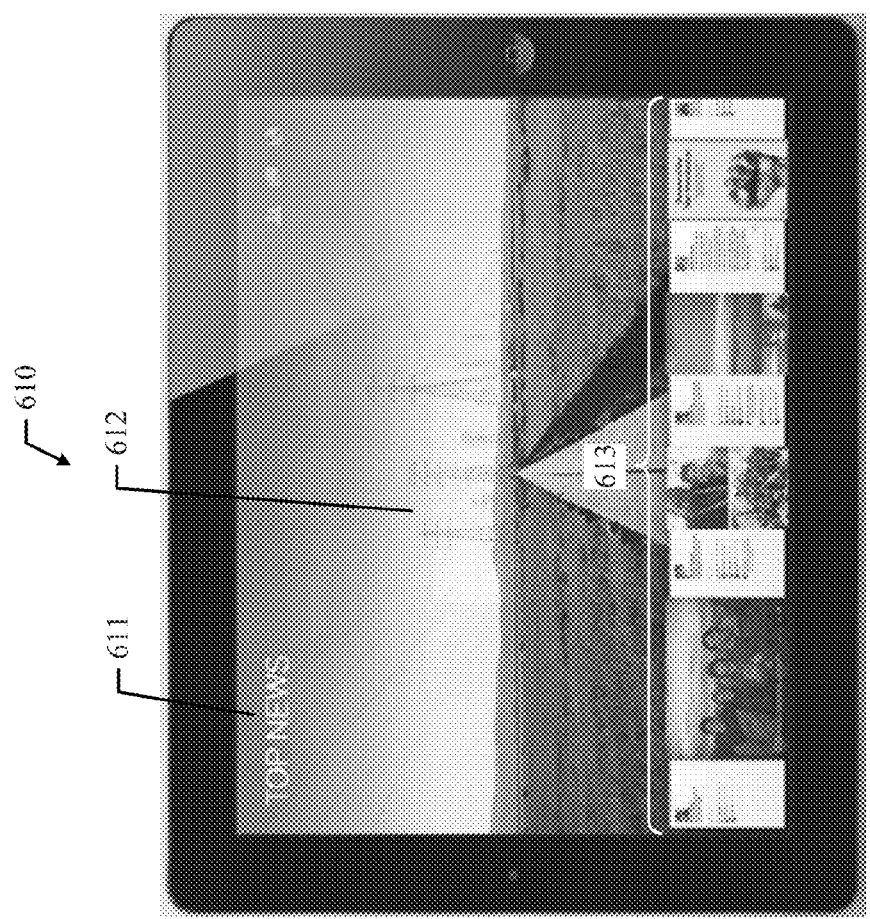
FIGS. 6A-6B illustrate example layouts suitable for different types of devices.
Figure 6B:
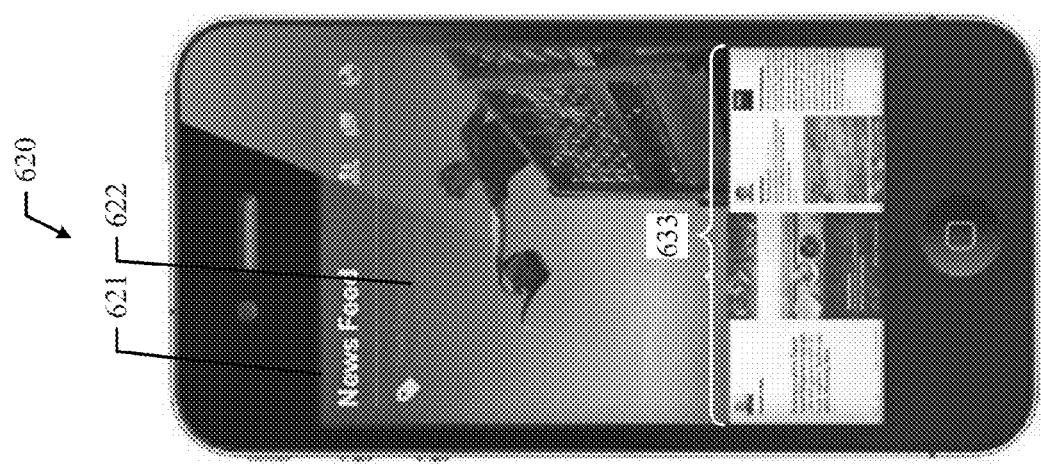

FIG. 6A illustrates the screen of an example device 610 (e.g., a tablet computer). FIG. 6B illustrates the screen of another example device 620 (e.g., a Smartphone). The screens of device 610 and device 620 have different sizes, orientations, and aspect ratios. In both cases, a content section, represented by its background image, and some of the content items of the content section, are displayed on the screens. Yet, comparing FIGS. 6A and 6B, the layout of the content section and its content items differs between device 610 and device 620. The layout used for device 610 is more suitable for the specific characteristics of the screen of device 610, while the layout used for device 620 is more suitable for the specific characteristics of the screen of device 620.

As an example, in both cases, the content section is represented by a background image. However, for device 610, background image 612 has the size, orientation, and aspect ratio that match the screen of device 610 so that it fills the entire screen of device 610. For device 620, background image 622 has the size, orientation, and aspect ratio that match the screen of device 620 so that it fills the entire screen of device 620. Here, the background image of a content section is selected based on the size, orientation, and aspect of the screen on which it is displayed.

As another example, in both cases, near the bottom of the screen, several content items of the content section are displayed in a series in the index mode. However, since device 610 has a wider screen, more content items 613 can be shown on the screen at a time. In contrast, device 620 has a narrower screen, and thus, fewer content items 633 (e.g., 4 content items in the case of FIG. 6B) are shown on the screen at a time. Here, the number of content items shown at a time (e.g., in the index mode) depends on the width of the screen on which they are displayed.

As a third example, in both cases, the content section has a title. For device 610, title 611 is shown in all capital letters and in a slightly larger font size. For device 620, title 621 is shown in a slightly smaller font size. Here, the title of a content section may be shown in different fonts, font sizes, colors, etc. depending on the characteristics of the screen on which it is displayed.

In particular embodiments, the content items of a content section are locked to that content section. Hierarchically, the content section is the parent of the content items belonging to it, and the content items are the children of the content section to which they belong. When a user scrolls from a first content section to a second content section, the content items of the second section replace the content items of the first section to be displayed on the screen. Similarly, when the user scrolls from content items of the first content section to content items of the second content section, the background image and title of the second content section replace the background image and title of the first content section to be displayed on the screen.

In particular embodiments, the content items of a content section may be selected based on the type of device on which they are displayed. For example, if a device has faster network connection or higher bandwidth, more multimedia content items (e.g., videos, audios, images) or content items with higher resolutions may be included in a content section. These types of content items often are larger in sizes. However, a device with faster network connection or higher bandwidth is able to download these content items quickly. Conversely, with a device that has slower network connection or lower bandwidth, more text content items or multimedia content items with lower resolutions may be included in a content section. These types of content items often are smaller in sizes so that a device with slower network connection or lower bandwidth can still download them reasonable quickly.

With some implementations, there may be multiple versions of a specific content item. Different versions of the content items may be selected for different types of devices for display. For example, there may be multiple versions of an image, of different resolutions and thus sizes. A version of the image with a smaller resolution may be selected for and sent to a Smartphone, which has a relatively smaller screen, while another version of the image with a larger resolution may be selected for and sent to a tablet computer, which has a relatively larger screen.

With some implementations, more number of content items may be included in each content section for a device with a larger screen, while less number of content items may be included in each content section for a device with a smaller screen.

Figure 7A:
FIGS. 7A-7B illustrate example features of a user interface.

In particular embodiments, some features of the user interface may be available on some types of devices but not available on other types of devices. As an example, in FIG. 7A, on device 610, the content sections, represented by their respective background images, may be arranged in a series 710 and displayed sequentially near the top of the screen in the index mode. A user may scroll back and forth through content section series 710, in the index mode, to view the available content sections or to select a specific content section (e.g., in order to view the content items of that section). With some implementations, to bring up content section series 710 on the screen, the user may swipe a finger downward on the screen. Conversely, to make content section series 710 go away from the screen, the user may swipe a finger upward on the screen. However, this specific feature (i.e., interacting with content sections in the index mode) may not be available on all platforms (e.g., it may not be available on a device that does not have a touchscreen).

Figure 7B:

As another example, for devices that do not have a physical keyboard, a virtual keyboard may be used to enable a user to provide input. FIG. 7B illustrates a virtual keyboard 720 on device 610. Virtual keyboard 720 may appear on the screen when the user needs to type some input (e.g., compose a message) and disappear from the screen when it is no longer needed (e.g., after the user finishes typing). However, a virtual keyboard may not be available on devices that have a physical board or on devices that do not have a touchscreen.

Figure 8A:
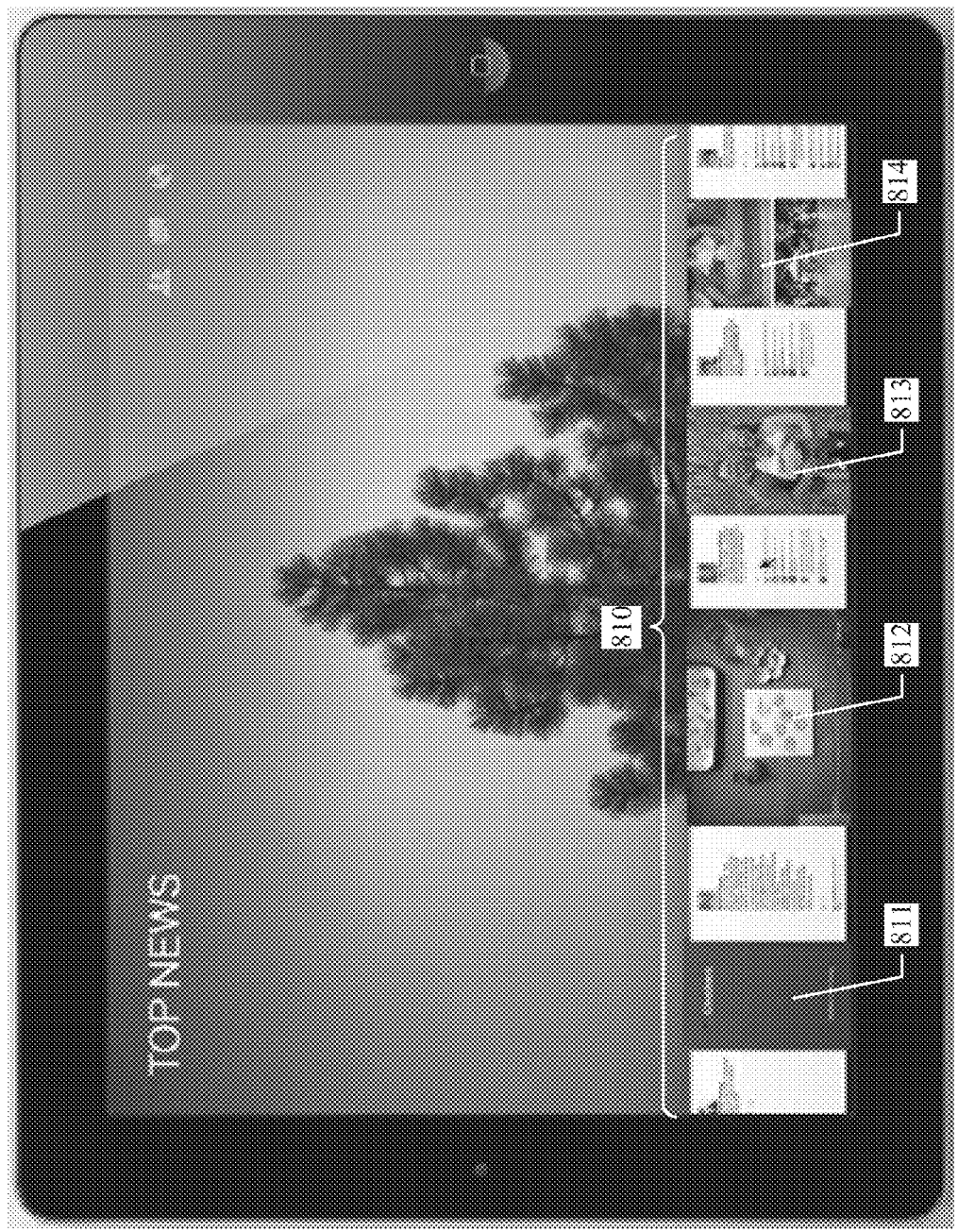
FIGS. 8A-8C illustrate visually indicating user-interactable content items in different display modes.
Figure 8B:
Figure 8C:

A user may interact with some content items (e.g., in addition to viewing them). In particular embodiments, a user-interactable content item is visually indicated. As an example, in FIG. 8A, a series of content items 810 is displayed in the index mode. Some of these content items, specifically, content items 811, 812, 813, and 814, are user-interactable. Content items 811, 812, 813, and 814 are visually distinguished from the other content items in series 810 (i.e., those content items that are not user-interactable) as they are visually represented as "floating" above the non-user-interactable content items in series 810. For example, for content item 811, its top and bottom edges extend slightly beyond the top and bottom edges of the two content items next to it, giving the impression that content item 811 floats above the two content items next to it. Similar visual indications are used with content items 812, 813, and 814. As another example, in FIG. 8B, content items 821 and 822 are displayed in the on-page mode. Here, content item 822 is user-interactable while content item 821 is not. Thus, content item 822 is visually distinguished by extending the top and bottom edges of content item 822 beyond the top and bottom edges of content item 821. As a third example, in FIG. 8C, content item 831 is displayed in the full-screen mode. Content item 831 is user-interactable, and thus, its top and bottom edges are slightly extended (e.g., beyond the top and bottom edges of the content item next to it, a strip of which is visible near the right edge of the screen). In each of these cases, a user-interactable content item is visually indicated by slightly extending its top and bottom edges so that it appears to be floating above those content items that are not user-interactable.

Figure 9A:
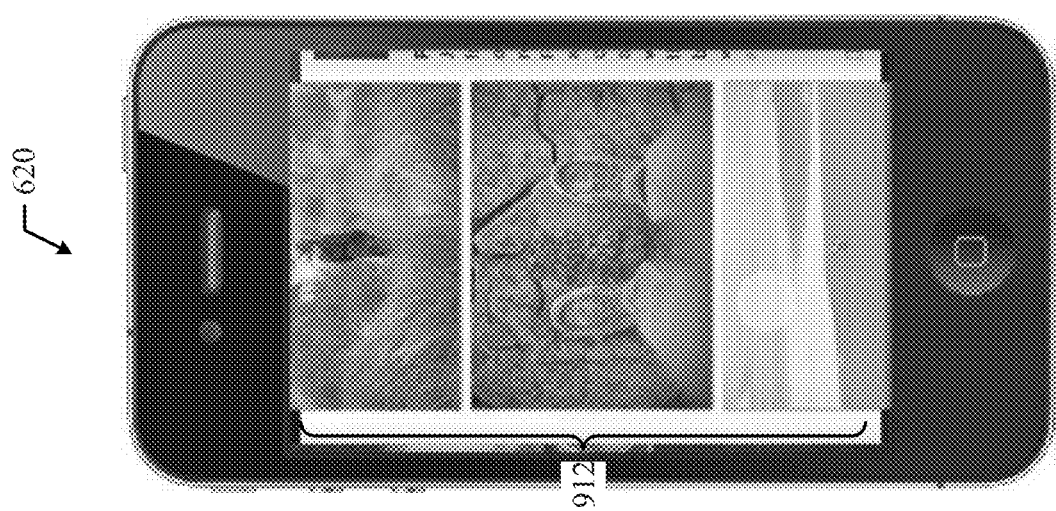
FIGS. 9A-9D illustrate various example user interactions with different types of content items.
Figure 9A:

A user may interact with a user-interactable content item in various ways. Often, how a user actually interacts with a content item depends on the type of content item. As an example, in FIG. 9A, given a series of images 911 or 912, a user may scroll through the images. Here, the images are displayed vertically. Thus, the user may scroll through these images vertically. In addition, the user may select one of the images in series 911 or 912 to display it in full-screen mode. Comparing the layout of series 911 displayed on the screen of device 610 and the layout of series 912 displayed on the screen of device 620, since the screen of device 610 is larger than that of device 620, series 911 does not take up the entire screen of device 610. Other information (e.g., user comments on the images) may also be displayed on the screen of device 610, together with series 911. On the other hand, series 912 does take up the entire screen of device 620 so that no other content item is displayed with series 912.

Figure 9B:
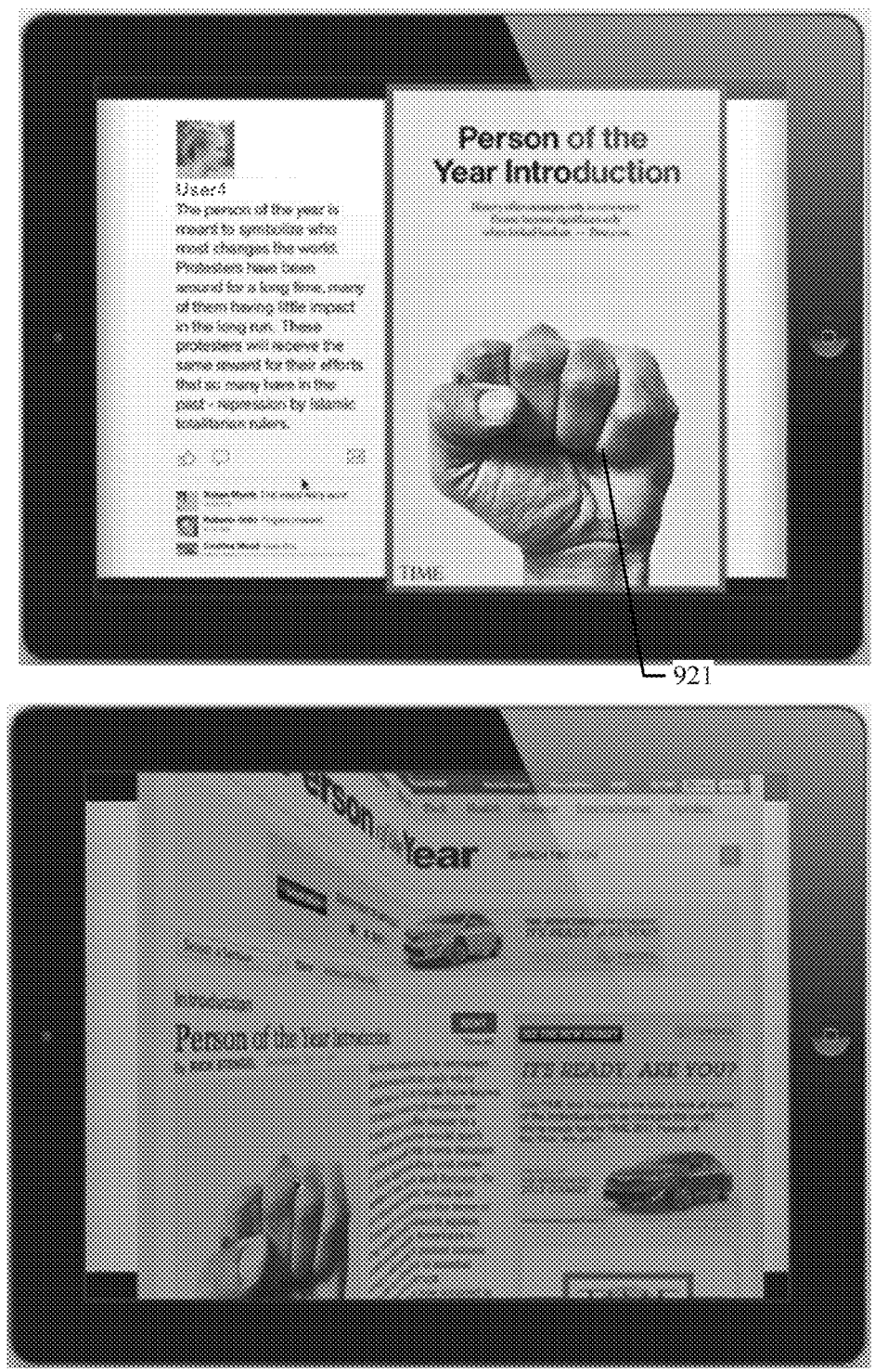
Figure 9C:
Figure 9D:
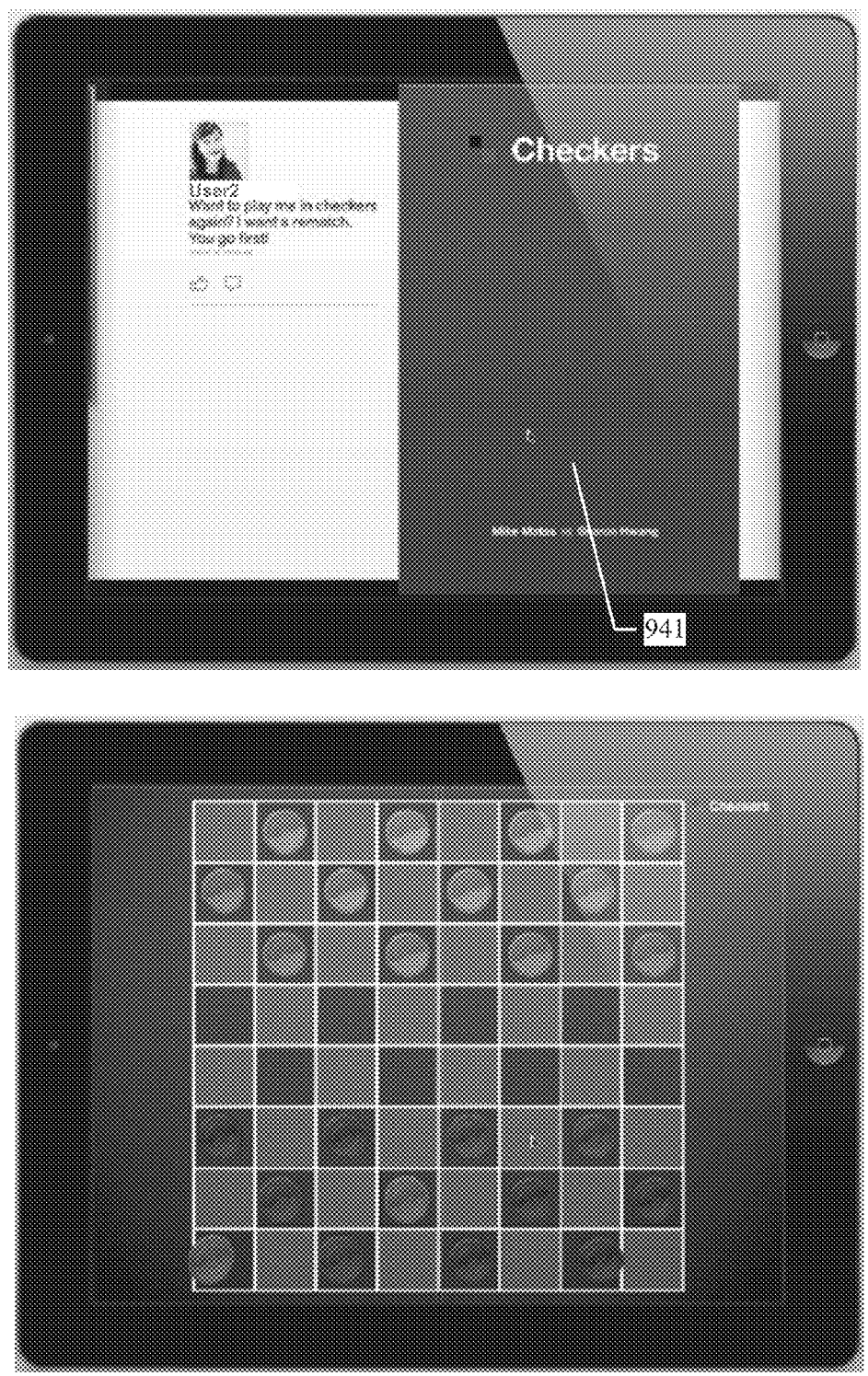

As another example, in FIG. 9B, content item 921 corresponds to a digital magazine. In response to a user selecting content item 921, the magazine opens up to its full content so that the user can read it. As a third example, in FIG. 9C, content item 931 corresponds to a movie trailer. In response to a user selecting content item 931, content item 931 opens up to the full-screen mode and the movie trailer is played. As a forth example, in FIG. 9D, content item 941 corresponds to a game. In response to a user selecting content item 941, content item 941 opens up to the full-screen mode and the user can play the game.

In each of these examples, when the user has finished with a specific content item (e.g., finished reading the magazine, watching the movie trailer, or playing the game), the user can close the content item from its full-screen mode and return to the on-page mode. From there, the user can move onto other content items.

In particular embodiments, a group of content items of the same type may be displayed together. For example, a photo album may include some number of photos, and the photos belonging to the same album may be displayed together. When a group of content items of a specific type is displayed, the layout of the content items may depend on the content type or the size, orientation, or aspect ratio of the screen on which they are displayed.

Figure 10A:
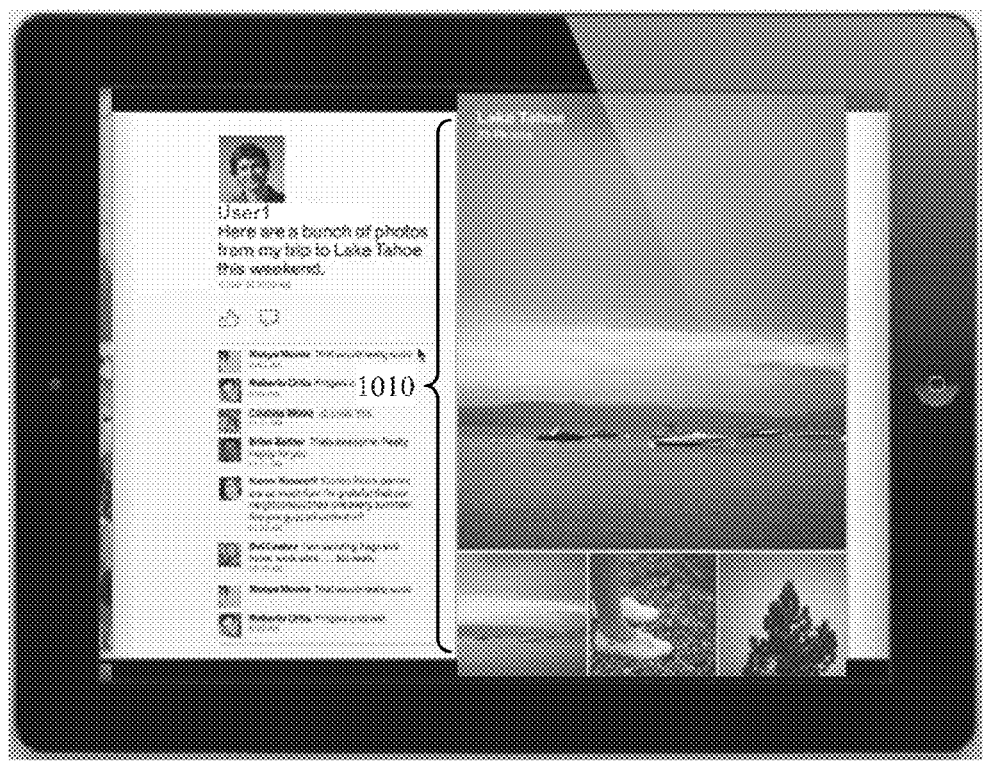
FIGS. 10A-10H illustrate example user interactions with a group of photos.
Figure 10B:

In FIG. 10A, a content item 1010, which corresponds to a photo album, is displayed in the on-page mode. Content item 1010 is visually indicated to be user interactable since its top and bottom edges extend slightly beyond the top and bottom edges of the content item next to it, which is not user interactable. Suppose that a user selects content item 1010. This causes content item 1010 (i.e., the photo album) to gradually open up, as illustrated in FIG. 10B.

Figure 10C:

Eventually, in FIG. 10C, the photos (e.g., thumbnails) of the photo album corresponding to content item 1010 are displayed. Note that each photo is itself a content item. Hierarchically, the photos may be the children of the photo album to which they belong, and in this case the photo album corresponding to content item 1010. Initially, the photo thumbnails are displayed using a grid layout. Here, the layout of the photo thumbnails may be determined based on the content type (i.e., image) or the size, orientation, or aspect ratio of the screen on which they are displayed.

Different layouts may be used for different content types or screens. In the case of FIG. 10C, since the content items are photo thumbnails, they can be resized or cropped to the same size and aspect ratio, and a grid layout is suitable for displaying the thumbnails of the photos.

Figure 10D:
Figure 10E:
Figure 10F:

The user may choose to reshuffle the photos (i.e., change the display order of the photos), as illustrated in FIG. 10D. The user may choose to change the display size of some of the photo thumbnails, as illustrated in FIG. 10E. As a result, in FIG. 10F, the photo thumbnails are now displayed in a different layout, accommodating the user's choices.

Figure 10G:
Figure 10H:

The user may select any one of the photo thumbnails to view it in the full-screen mode. In FIG. 10G, the user has selected a specific thumbnail. In response, the thumbnail gradually increases in size. Eventually, in FIG. 10H, the photo itself is displayed in the full-screen mode.

Figure 11:
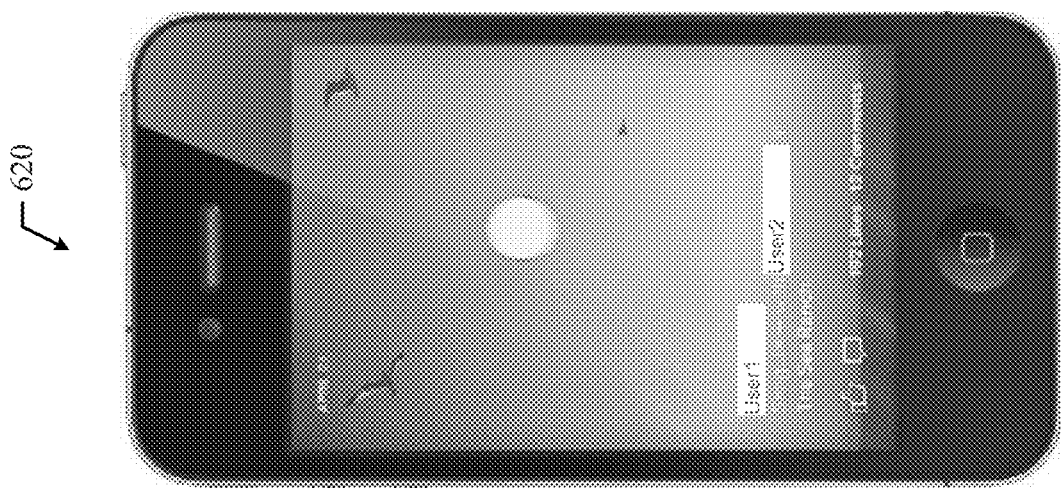
FIG. 11 illustrates cropping an image for different types of devices when displaying the image in the full-screen mode.
Figure 11:
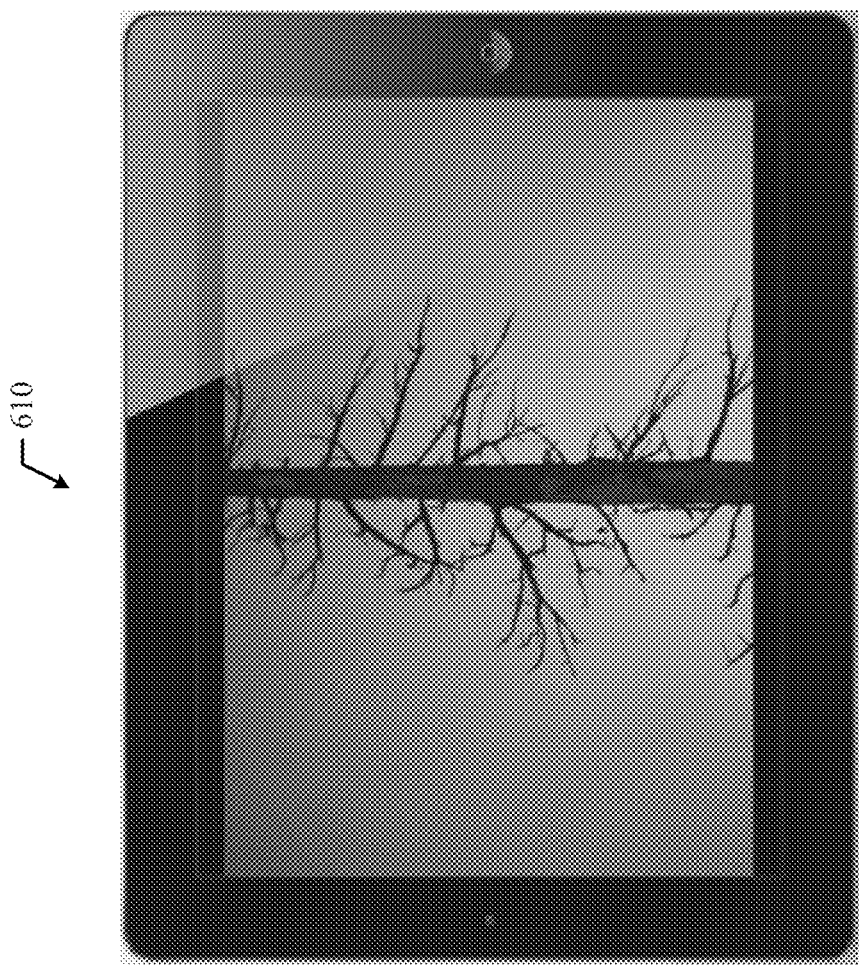

When an image is displayed in the full-screen mode, the image may be automatically resized or cropped based on the size, orientation, or aspect ratio of the screen on which it is displayed. For example, in FIG. 11, when an image is displayed on device 610, the image is cropped to fit the screen of device 610. When another image is displayed on device 620, the image is cropped to fit the screen of device 620. Subsequently, a user may zoom in or out of the image to view more or less details.

Figure 12:
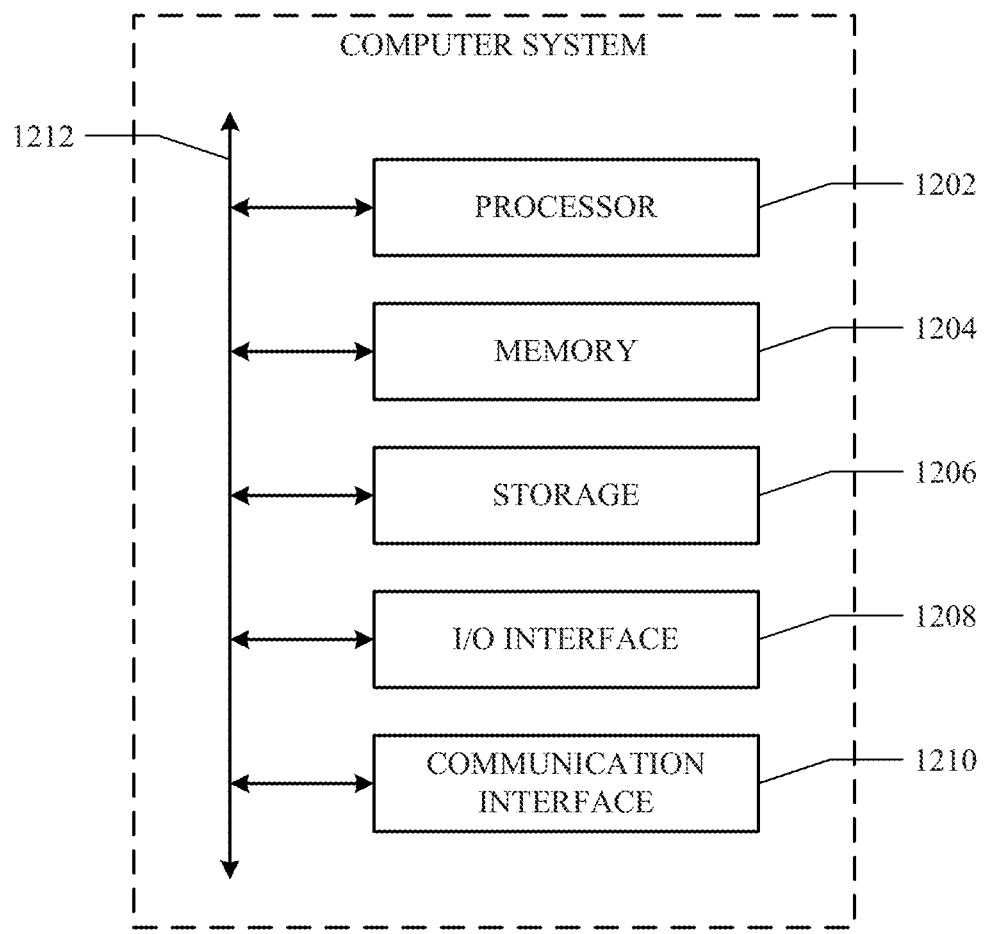
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method comprising:
    presenting a hierarchical user interface on a screen of an electronic device, the hierarchical user interface having one or more content sections at a first level and each content section having one or more content items at one or more second levels above the first level;
    adjusting a layout of the content sections or the content items of each content section based on a size, orientation, or aspect ratio of the screen of the electronic device;
    visually indicating that one or more content items, which are displayed in their entirety, are user interactable by displaying the content items as visually floating above and extending beyond the content sections at the first level in one of a vertical or horizontal direction;
    enabling a user to view and interact with the content sections and the content items of each content section,
    wherein the one or more content sections at the first level are displayed to cover an entirety of the screen of the electronic device in at least one display mode and in another display mode during which the one or more content items are visually indicated as visually floating above and extending beyond the content sections in the vertical or horizontal direction, the one or more content sections at the first level covering substantially an entirety of the screen of the electronic device in the one of the vertical or horizontal direction to enable the visual indication of the user interactable content items as floating above and extending slightly beyond edges of the content sections at the first level and covering an entirety of the screen along the other of the one of the vertical or horizontal direction, at least one content item of one of the content sections being automatically increased or decreased in size based on the size, orientation, or aspect ratio of the screen without any user input, and
    wherein the one or more content sections of the one or more second levels are displayed to cover only a portion of the screen and overlap at least a portion of the first level, a number of the content items for the one or more content sections being automatically determined based on the size, orientation, or aspect ratio of the screen without any user input.

2. The method of claim 1, further comprising
    selecting the content items for each content section based on a size, orientation, or aspect ratio of the screen of the electronic device.

3. The method of claim 1, further comprising
    adjusting a layout of a type of content items based on a size, orientation, or aspect ratio of the screen of the electronic device.

4. The method of claim 1, further comprising
    adjusting a layout of a type of content items based on the content type.

5. The method of claim 1, wherein:
    each content section is associated with a background image;
    when the user is viewing a specific content section, the background image of the specific content section is displayed; and
    the user scrolls through the content sections by scrolling through the background images of the content sections.

6. The method of claim 1, wherein:
    there is a plurality of display modes for presenting the content items of each content section; and
    when the user is viewing the content items of a specific content section, the user is able to choose and transition between specific display modes for viewing the content items.

7. The method of claim 1, further comprising
    for each content section, locking the content items of the content section to the content section, such that when the user scrolls from a first content section to a second content section, the content items of the second content section replace the content items of the first content section.

8. The method of claim 1, further comprising
    enabling the user to consume the content items of each content section uniformly, such that each specific user interaction, when applied to each content item of each content section, results in a same type of response from each content item of each content section.

9. One or more computer-readable non-transitory storage media embodying software that is operable when executed to:
    present a hierarchical user interface on a screen of an electronic device, the hierarchical user interface having one or more content sections at a first level and each content section having one or more content items at one or more second levels above the first level;
    adjust a layout of the content sections or the content items of each content section based on a size, orientation, or aspect ratio of the screen of the electronic device;
    visually indicate that one or more content items, which are displayed in their entirety, are user interactable by displaying the content items as visually floating above and extending beyond the content sections at the first level in one of a vertical or horizontal direction;
    enable a user to view and interact with the content sections and the content items of each content section,
    wherein the one or more content sections at the first level are displayed to cover an entirety of the screen of the electronic device in at least one display mode and in another display mode during which the one or more content items are visually indicated as visually floating above and extending beyond the content sections in the vertical or horizontal direction, the one or more content sections at the first level covering substantially an entirety of the screen of the electronic device in the one of the vertical or horizontal direction to enable the visual indication of the user interactable content items as floating above and extending slightly beyond edges of the content sections at the first level and covering an entirety of the screen along the other of the one of the vertical or horizontal direction, at least one content item of one of the content sections being automatically increased or decreased in size based on the size, orientation, or aspect ratio of the screen without any user input, and wherein the one or more content sections of the one or more second levels are displayed to cover only a portion of the screen and overlap at least a portion of the first level, a number of the content items for the one or more content sections being automatically determined based on the size, orientation, or aspect ratio of the screen without any user input.

10. The media of claim 9, wherein the software is further operable when executed to select the content items for each content section based on a size, orientation, or aspect ratio of the screen of the electronic device.

11. The media of claim 9, wherein the software is further operable when executed to adjust a layout of a type of content items based on a size, orientation, or aspect ratio of the screen of the electronic device.

12. The media of claim 9, wherein the software is further operable when executed to adjust a layout of a type of content items based on the content type.

13. A system comprising:

one or more processors; and a memory coupled to the processors comprising instructions executable by the processors, the processors operable when executing the instructions to:

present a hierarchical user interface on a screen of an electronic device, the hierarchical user interface having one or more content sections at a first level and each content section having one or more content items at one or more second levels above the first level;

adjust a layout of the content sections or the content items of each content section based on a size, orientation, or aspect ratio of the screen of the electronic device;

visually indicate that one or more content items, which are displayed in their entirety, are user interactable by displaying the content items as visually floating above and extending beyond the content sections at the first level in one of a vertical or horizontal direction;

enable a user to view and interact with the content sections and the content items of each content section, wherein the one or more content sections at the first level are displayed to cover an entirety of the screen of the electronic device in at least one display mode and in another display mode during which the one or more content items are visually indicated as visually floating above and extending beyond the content sections in the vertical or horizontal direction, the one or more content sections at the first level covering substantially an entirety of the screen of the electronic device in the one of the vertical or horizontal direction to enable the visual indication of the user interactable content items as floating above and extending slightly beyond edges of the content sections at the first level and covering an entirety of the screen along the other of the one of the vertical or horizontal direction, at least one content item of one of the content sections being automatically increased or decreased in size based on the size, orientation, or aspect ratio of the screen without any user input, and wherein the one or more content sections of the one or more second levels are displayed to cover only a portion of the screen and overlap at least a portion of the first level, a number of the content items for the one or more content sections being automatically determined based on the size, orientation, or aspect ratio of the screen without any user input.

14. The system of claim 13, wherein the processors are further operable when executing the instructions to select the content items for each content section based on a size, orientation, or aspect ratio of the screen of the electronic device.

15. The system of claim 13, wherein the processors are further operable when executing the instructions to adjust a layout of a type of content items based on a size, orientation, or aspect ratio of the screen of the electronic device.

16. The system of claim 13, wherein the processors are further operable when executing the instructions to adjust a layout of a type of content items based on the content type.

* * * * *